United States Patent
Gorodisher

(10) Patent No.: US 9,611,360 B2
(45) Date of Patent: Apr. 4, 2017

(54) CURABLE COMPOSITION, ARTICLE, METHOD OF CURING, AND TACK-FREE REACTION PRODUCT

(75) Inventor: Ilya Gorodisher, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/003,129

(22) PCT Filed: Mar. 27, 2012

(86) PCT No.: PCT/US2012/030680
§ 371 (c)(1),
(2), (4) Date: Sep. 4, 2013

(87) PCT Pub. No.: WO2012/135180
PCT Pub. Date: Oct. 4, 2012

(65) Prior Publication Data
US 2014/0010983 A1      Jan. 9, 2014

Related U.S. Application Data

(60) Provisional application No. 61/468,326, filed on Mar. 28, 2011.

(51) Int. Cl.
C08G 75/14 (2006.01)
C08L 63/00 (2006.01)
C08G 59/50 (2006.01)
C08G 77/392 (2006.01)

(52) U.S. Cl.
CPC ........... *C08G 75/14* (2013.01); *C08G 59/504* (2013.01); *C08G 77/392* (2013.01); *C08L 63/00* (2013.01); *Y10T 428/1476* (2015.01)

(58) Field of Classification Search
CPC .............................. C08L 63/00; C08G 75/14
USPC ...................................................... 428/41.8
See application file for complete search history.

(56) References Cited

U.S. PATENT DOCUMENTS

| | | | |
|---|---|---|---|
| 4,501,864 A | 2/1985 | Higginbottom | |
| 4,507,428 A | 3/1985 | Higginbottom | |
| 5,280,067 A | 1/1994 | Tarbutton | |
| 5,543,516 A | 8/1996 | Ishida | |
| 7,041,772 B2 | 5/2006 | Aizawa | |
| 7,452,585 B1* | 11/2008 | Wong et al. | 428/117 |
| 7,517,925 B2* | 4/2009 | Dershem et al. | 524/95 |
| 7,537,827 B1* | 5/2009 | Lehmann et al. | 428/297.1 |
| 8,029,889 B1* | 10/2011 | Li et al. | 428/292.1 |
| 8,383,706 B2 | 2/2013 | Gorodisher | |
| 2005/0288457 A1* | 12/2005 | Liu et al. | 525/529 |
| 2008/0076886 A1* | 3/2008 | Burns et al. | 525/540 |
| 2008/0200084 A1* | 8/2008 | Angus et al. | 442/59 |
| 2009/0181165 A1* | 7/2009 | Liang et al. | 427/99.4 |
| 2009/0234079 A1* | 9/2009 | Burns et al. | 525/435 |
| 2009/0240003 A1* | 9/2009 | Burns et al. | 525/410 |
| 2010/0151253 A1* | 6/2010 | Roth et al. | 428/413 |
| 2010/0307680 A1 | 12/2010 | Gorodisher | |
| 2010/0312004 A1 | 12/2010 | Gorodisher | |
| 2011/0054100 A1 | 3/2011 | Gorodisher | |
| 2012/0156487 A1* | 6/2012 | Schoenfeld et al. | 428/375 |
| 2013/0140738 A1 | 6/2013 | Gorodisher | |
| 2013/0209812 A1* | 8/2013 | Gorodisher et al. | 428/458 |
| 2013/0242487 A1* | 9/2013 | Fujioka et al. | 361/679.01 |
| 2015/0045528 A1* | 2/2015 | Gorodisher et al. | 528/96 |

FOREIGN PATENT DOCUMENTS

| | | |
|---|---|---|
| CN | 101288006 | 10/2008 |
| JP | 2009-91438 A | 4/2009 |
| JP | 2009-167251 A | 7/2009 |
| JP | 2009-167252 A | 7/2009 |
| WO | WO 00/27921 | 5/2000 |
| WO | WO 2007/064801 | 6/2007 |
| WO | WO 2008/095837 | 8/2008 |
| WO | WO 2008/095850 | 8/2008 |
| WO | WO 2009/115586 | 9/2009 |
| WO | WO 2010/141396 | 12/2010 |
| WO | WO 2010/141397 | 12/2010 |
| WO | WO 2011/025652 | 3/2011 |
| WO | WO 2012/018753 | 2/2012 |
| WO | WO 2012/092332 | 7/2012 |
| WO | WO 2012/134731 | 10/2012 |

OTHER PUBLICATIONS

English language machine translation of JP 2009-167252. Translation printed Feb. 24, 2016. Original Japanese document published Jul. 30, 2009.*
Ghosh, "Polybenzoxazines—New high performance thermosetting resins: Synthesis and properties", Progress in Polymer Science, 2007, vol. 32, pp. 1344-1391.
Rimdusit, "Development of new class of electronic packaging materials based on ternary systems of benzoxazine, epoxy and phenolic resins", Polymer, 2000, vol. 41, pp. 7941-7949.
International Search Report for PCT International Application No. PCT/US2012/030680, mailed on Aug. 22, 2012, 4 Pages.
Co-pending U.S. Appl. No. 14/003,121, entitled "Curable Composition, Article, Method of Curing, and Reaction Product" (Gorodisher), filed Mar. 6, 2012.

* cited by examiner

*Primary Examiner* — Megan McCulley
(74) *Attorney, Agent, or Firm* — Bradford B. Wright

(57) ABSTRACT

A curable composition includes 3-substituted benzoxazine, polyepoxide, and polythiol. Articles including the curable composition, methods of curing the curable composition, and a tack-free reaction product preparable from the curable composition are also disclosed.

20 Claims, 7 Drawing Sheets

CURABLE COMPOSITION, ARTICLE, METHOD OF CURING, AND TACK-FREE REACTION PRODUCT

BACKGROUND

In their simplest form, 3-substituted-3,4-dihydro-2H-1,3-benzoxazines (hereinafter referred to as 3-substituted benzoxazines) are compounds containing the following structural unit:

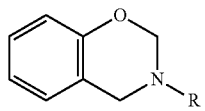

wherein R represents a monovalent organic group. In many cases, they are further substituted at one or more of the ring carbons. In those cases wherein R contains one or more aromatic groups, the 3-substituted benzoxazines may be highly viscous or even solid under ambient conditions.

3-Substituted benzoxazines typically homopolymerize at elevated temperature, and may be typically cured at lower temperature using a polythiol. For example, PCT Published Patent Application WO 2010/141396 A1 (Gorodisher et al.) describes benzoxazine-thiol adducts which may be cured to produce compositions useful in coatings, sealants, adhesives, and other applications. Similarly, PCT Published Patent Application WO 2009/115586 A1 (Burns et al.) describes adducts useful for improving the toughness and curable compositions using such toughening adducts.

SUMMARY

The present inventor has found that mixtures of N-aryl-substituted benzoxazines and thiols often result in adducts that exhibit desirable thermal stability and reactivity, but have high viscosities that can make them difficult to work with. In contrast, mixtures of 3-substituted benzoxazines (e.g., N-alkyl benzoxazines) and thiols often exhibit reduced thermal stability and increased reactivity.

The present inventor discovered 3-substituted benzoxazine/thiol-based compositions that overcome the aforementioned shortcomings while potentially imparting additional benefits to said materials.

Accordingly, in one aspect, the present disclosure provides a curable composition comprising:

x equivalents of at least one 3-substituted benzoxazine, wherein x is a number greater than 0;

at least one polyepoxide, wherein the at least one polyepoxide contains y equivalents of glycidyl groups, wherein y is a number greater than or equal to 0; and z equivalents of at least one polythiol selected from the group consisting of

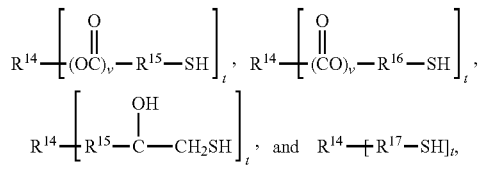

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, an hydroxy alkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
$R^{17}$ is an alkylene group having from 1 to 30 carbon atoms,
wherein z is a number greater than 0, and wherein z is in a range of from $0.1(x+y)$ to $(x+y)$.

In another aspect, the present disclosure provides a method of curing a composition, the method comprising:
providing a curable composition according to the present disclosure; and
curing the curable composition.

In another aspect, the present disclosure provides a tack-free reaction product of a curable composition, the curable composition comprising:
x equivalents of at least one 3-substituted benzoxazine, wherein x is a number greater than 0;
at least one polyepoxide, wherein the at least one polyepoxide contains y equivalents of glycidyl groups, wherein y is a number greater than or equal to 0; and
z equivalents of at least one polythiol selected from the group consisting of

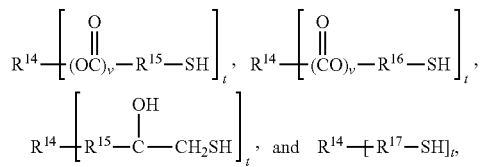

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, an hydroxy alkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
$R^{17}$ is an alkylene group having from 1 to 30 carbon atoms,
wherein z is a number greater than 0, and wherein z is in a range of from $0.1(x+y)$ to $(x+y)$.

In yet another aspect, the present disclosure provides an article comprising a curable composition according to the present disclosure disposed on a releasable liner.

Advantageously, compositions according to the present disclosure can be formulated such that they exhibit good thermal stability and good reactivity while having lower viscosity than corresponding 3-substituted benzoxazine/ thiol-based compositions. In some cases additional benefits may be obtained.

For example, curable compositions according to the present disclosure can be formulated to reduce cure time needed to achieve a glass transition temperature of 100 degrees Celsius (° C.).

In some embodiments, curable compositions according to the present disclosure comprise a B-stage composition (e.g., as a sheet or tape), wherein flexibility and degree of tackiness are typically important parameters with regard to handling. Strategic choice of polyepoxide and/or polythiol allows deliberate tailoring of flexibility and adhesive properties with a wider range of 3-substituted benzoxazines than previously possible.

The features and advantages of the present disclosure will be further understood upon consideration of the detailed description as well as the appended claims.

Figure 1:
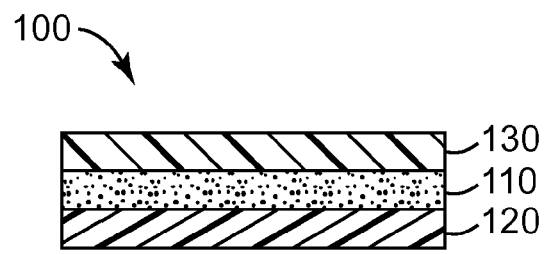
FIG. 1 is a schematic cross-sectional view of an exemplary article 100 according to the present disclosure.

While the above-identified drawing figures set forth several embodiments of the present disclosure, other embodiments are also contemplated, as noted in the discussion. In all cases, this disclosure presents the disclosure by way of representation and not limitation.

DETAILED DESCRIPTION

As used herein, the term "heteroalkyl" refers to alkyl wherein one or more heteroatoms independently selected from S, O, and N are substituted for carbon. Examples include, methoxy, ethoxy, propoxy, 3,6-dioxaheptyl, and 4-dimethylaminobutyl.

As used herein, the term "heteroaryl" refers to aryl wherein one or more heteroatoms independently selected from S, O, and N are substituted for carbon. Examples include pyridyl, furanyl, pyrrolyl, thienyl, thiazolyl, oxazolyl, imidazolyl, indolyl, benzofuranyl, and benzthiazolyl.

As used herein, the term "hydrocarbyl" refers to a hydrocarbon wherein one hydrogen atom has been removed. Examples include phenyl, butyl, methyl, dodecyl, behenyl, ethyl phenyl, and diphenylmethyl.

As used herein, the term "heterohydrocarbyl" refers to hydrocarbyl wherein one or more heteroatoms independently selected from S, O, and N are substituted for carbon. Examples include methoxy, ethoxy, propoxy, 4-diphenylaminobutyl, 2-(2'-phenoxyethoxy)ethyl, 3,6-dioxaheptyl, and 3,6-dioxahexyl-6-phenyl.

Curable compositions according to the present disclosure include at least one 3-substituted benzoxazine. 3-Substituted benzoxazines are typically prepared by the condensation of a phenol, primary amine, and an aliphatic aldehyde (typically formaldehyde); for example, according to long-established methods, although other aldehydes (e.g., alicyclic aldehydes or alkaryl aldehydes) may also be used.

If compounds with greater inclusion of 3-substituted benzoxazine moieties are desired, then polyamines having more than two amino groups can be used. Alternatively, polyphenols such as, for example, bisphenol A or bisphenol F can be combined with monoamines and formaldehyde to make compounds with more than one 3-substituted benzoxazine group. If desired, oligomeric and/or polymeric benzoxazine resins can be made using polyphenols in combination with polyamines and formaldehyde. For further details concerning synthesis of 3-substituted benzoxazines (including resins) see, for example, U.S. Pat. No. 4,501,864 (Higginbottom); U.S. Pat. No. 5,543,516 (Ishida); and U.S. Pat. No. 7,041,772 (Aizawa et al.). Other methods are described by N. N. Ghosh et al. in "Polybenzoxazine-new high performance thermosetting resins: synthesis and properties", *Prog. Polym. Sci.* (2007), vol. 32, pp. 1344-1391.

The 3-substituted benzoxazine may have additional substituents. For example, in some embodiments, the 3-substituted benzoxazine may be represented by the formula

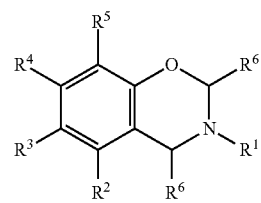

wherein
$R^1$ represents a hydrocarbyl or heterohydrocarbyl group having from 1 to 20 carbon atoms. In some embodiments, $R^1$ has from 1 to 20 carbon atoms or even from 1 to 8 carbon atoms. Examples include phenyl, methyl, ethyl, dodecyl, —$CH_2CH_2N(CH_3)$, and $C_6H_5NH(CH_2)_2NH(CH_2)_2NH_2$.

$R^2$, $R^3$, $R^4$, and $R^5$, taken alone or in combination, independently represent H, halogen (e.g., Br, Cl, F), a hydrocarbyl group having from 1 to 12 carbon atoms, or a heterohydrocarbyl group having from 1 to 12 carbon atoms. For example, $R^2$-$R^5$ may independently represent alkyl (e.g., methyl, ethyl, propyl, hexyl, ethylhexyl, or octyl), aryl (e.g., phenyl, naphthyl, or phenanthryl), aralkyl (e.g., phenylethyl or benzyl), or alkaryl (e.g., ethylphenyl, dimethylphenyl, or methylphenyl), heteroalkyl (e.g., methoxy, methoxyethyl, thioethyl, dimethylamino, diethylamino, ethoxy, propoxy, 3,6-dioxaheptyl, or 4-dimethylaminobutyl), heteroaryl (e.g., pyridyl, furanyl, pyrrolyl, thienyl, thiazolyl, oxazolyl, imidazolyl, indolyl, benzofuranyl, and benzthiazolyl), heteroalkaryl, heteroaralkyl.

$R^6$ represents H, or a hydrocarbyl group having from 1 to 12 carbon atoms. Examples include (e.g., methyl, ethyl, propyl, hexyl, ethylhexyl, or octyl), aryl (e.g., phenyl, or naphthyl), aralkyl (e.g., phenylethyl or benzyl), or alkaryl (e.g., ethylphenyl, dimethylphenyl, or methylphenyl).

In some embodiments, 3-substituted benzoxazine may be represented by the formula

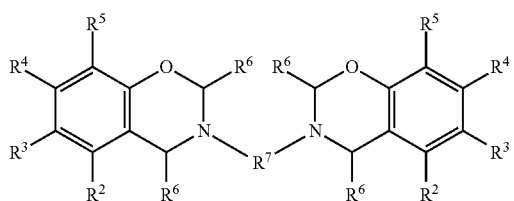

wherein $R^2$, $R^3$, $R^4$, $R^5$, and $R^6$ are as previously defined, and $R^7$ represents a divalent organic group having from 1 to 50 carbon atoms. Examples of $R^7$ include alkylene having from 1 to 12 carbon atoms (e.g., methylene, ethylene, propylene, dodecylene), arylene (e.g., phenylene, biphenylene), heteroalkylene (e.g., $-(CH_2CH_2NH)_{1-10}CH_2CH_2-$, $-(CH_2CH_2CH_2NH)_{1-10}CH_2CH_2CH_2CH_2-$, $-(CH_2)_4NH(CH_2)_3-$, $-(CH_2)_3NH(CH_2)_4NH(CH_2)_3-$, $-(CH_2)_3NH(CH_2)_2NH(CH_2)_3-$, $-(CH_2)_2NH(CH_2)_3NH(CH_2)_2-$, $-(CH_2)_3NH(CH_2)_2-$, $-(CH_2CH_2O)_{1-20}CH_2CH_2-$, and $-(CH_2CH_2CH_2O)_{1-15}CH_2CH_2CH_2-$), and $-(CH_2)_3NHCH_2CH=CHCH_2NH(CH_2)_3-$.

Commercially available 3-substituted benzoxazines include those available under the trade designation ARALDITE MT from Huntsman Corp. LLC (Salt Lake City, Utah). Examples include:

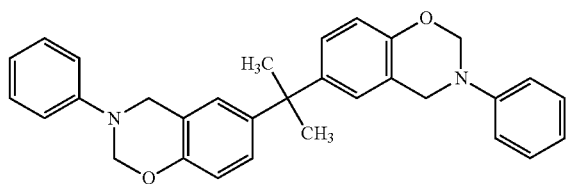 [SMILES: CC(C)(c1ccc2c(c1)CN(c1ccccc1)CO2)c1ccc2c(c1)CN(c1ccccc1)CO2]

which is available as ARALDITE MT 35600;

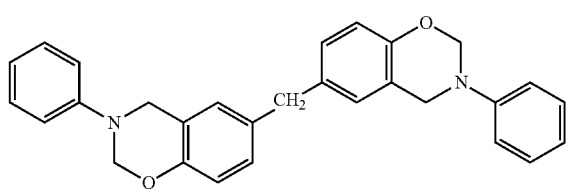 [SMILES: c1ccc(N2COc3ccc(Cc4ccc5c(c4)CN(c4ccccc4)CO5)cc3C2)cc1]

which is available as ARALDITE MT 35700;

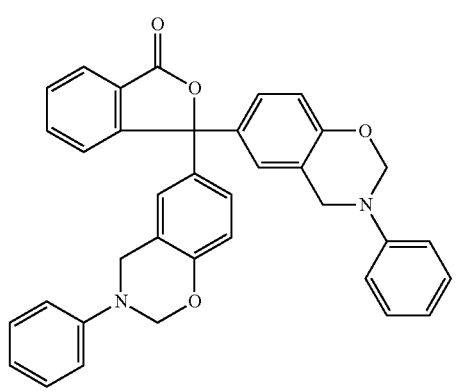 [SMILES: O=C1OC(c2ccc3c(c2)CN(c2ccccc2)CO3)(c2ccc3c(c2)CN(c2ccccc2)CO3)c2ccccc21]

which is available as ARALDITE MT 35800;

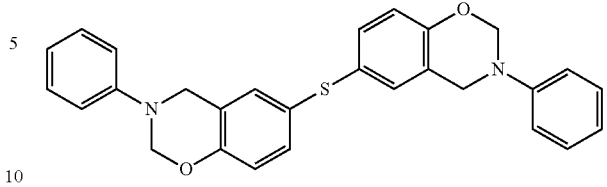

which is available as ARALDITE MT 35900; and

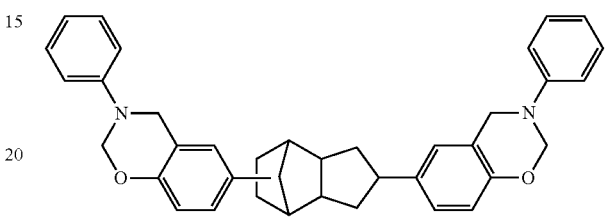

which is available as ARALDITE MT 36000.

Additional commercially available 3-substituted benzoxazines include

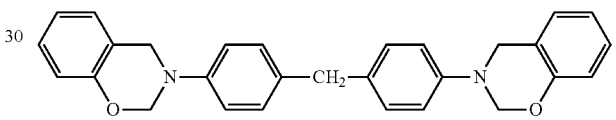

which is available as P-D BENZOXAZINE from Shikoku Chemicals Corporation (Kagawa, Japan).

If difunctional amines (i.e., diamines) are used, then compounds having two benzoxazine moieties are obtained; for example, as shown below wherein Z represents a divalent organic group.

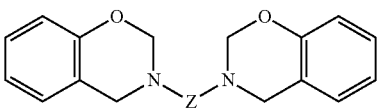

Only a limited representation of useful 3-substituted benzoxazines are set forth above, and other structures of the 3-substituted benzoxazine are also contemplated; for example, as will result from their synthesis using various phenols, amines, and aldehydes according to the methods cited above. Exemplary such phenols, amines, and aldehydes are discussed below.

Mono- and polyphenols may be used. The phenol may be further substituted without limitation is desired. For example, the phenol may be substituted with substituents such as alkyl, cycloalkyl, heterocycloalkyl, aryl, heteroaryl, aralkyl, heteroaralkyl, alkoxy, alkoxyalkylene, hydroxyalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfo, or alkylsulfonyl groups. Desirably, at least one of the ring positions adjacent to the phenolic hydroxyl group is unsubstituted to facilitate benzoxazine ring formation.

The aryl portion of the phenol may be a phenyl ring, or may be selected from naphthyl, biphenyl, phenanthryl, and anthracenyl. The aryl ring of the phenol may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol, cresol, 2-bromo-4-methylphenol, 2-allyphenol, 4-aminophenol. Examples of polyphenols include phenolphthalein; biphenol; bisphenol F; 4,4'-dihydroxybenzophenone; bisphenol A; 1,8-dihydroxyanthraquinone; 1,6-dihydroxynaphthalene; 2,2'-dihydroxyazobenzene; resorcinol; fluorine bisphenol; and 1,3,5-trihydroxybenzene. Combinations of phenols may be used.

Aldehydes suitable for preparing 3-substituted benzoxazines include, for example, formaldehyde, paraformaldehyde, 1,3,5-trioxane, and aliphatic aldehydes (e.g., aliphatic aldehydes having from 1 to 12 carbon atoms). Examples of aliphatic aldehydes include crotonaldehyde, acetaldehyde, propionaldehyde, butyraldehyde, and heptaldehyde. Combinations of aldehydes may be used.

Amines useful in preparing 3-substituted benzoxazines can be substituted or unsubstituted, mono-, di-substituted or higher (hetero)hydrocarbylamines having at least one primary amine group. For example, the amines may be aliphatic, alicyclic, or aromatic amines. Amines can be substituted with groups such as, for example, alkyl, cycloalkyl, heterocycloalkyl, aryl, heteroaryl, aralkyl, or heteroaralkyl. Combinations of amines may be used.

Amines useful in the preparation of 3-substituted benzoxazines include, for example, those of the formula $R^9(NH_2)_k$ include (hetero)hydrocarbyl monoamines and polyamines. $R^9$ may be a (hetero)hydrocarbyl group that has a valence of k. In some embodiments, $R^9$ is alkyl, a cycloalkyl or aryl and k is 1, 2, 3, or 4. In some embodiments, $R^9$ may be selected from mono- and polyvalent organic groups having from 1 to 30 carbon atoms. In some embodiments, $R^9$ is a poly (alkyleneoxy) group (e.g., poly(ethyleneoxy), poly(propyleneoxy), or poly(ethyleneoxy-co-propyleneoxy)). In some embodiments, $R^9$ comprises a non-polymeric aliphatic, alicyclic, aromatic, or alkyl-substituted aromatic moiety having from 1 to 30 carbon atoms. In some embodiments, $R^9$ comprises a monovalent polymeric group, e.g., derived from a polyoxyalkylene, polyester, polyolefin, poly(meth)acrylate, polystyrene, or polysiloxane.

Any primary amine may be used. Useful monoamines include, for example, methyl-, ethylamine, propylamine, hexylamine, octylamine, dodecylamine, dimethyl amine, methyl ethyl amine and aniline. The terms "diamine" and "polyamine," refer to organic compounds containing two or at least two primary amine groups, respectively. Aliphatic, aromatic, alicyclic, and oligomeric di- and poly-amines all are considered useful in the practice of the present disclosure. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include, for example, N-methyl-1,3-propanediamine, N-ethyl-1,2-ethanediamine, 2-(2-aminoethylamino)ethanol, pentaethylenehexaamine, ethylenediamine, hexamethylenediamine, dodecanediamine, N-methylethanolamine; and 1,3-propanediamine.

Examples of useful polyamines include polyamines having at least two amino groups, wherein at least one of the amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine).

Useful polyamines also include poly(alkyleneoxy) polyamines such as, for example, $H_2N-R^{10}-O-(R^{11}O)_p-(R^{12}O)_q-(R^{11}O)_r-R^{10}-NH_2$ and $[H_2N-R^{10}O-(R^{11}O)_p-]_s-R^{13}$.

$R^{10}$, $R^{11}$, and $R^{12}$ are independently alkylene groups having from 1 to 10 carbon atoms. For example, $R^{10}$ may be an alkyl group having 2 to 4 carbon atoms (e.g., ethyl, n-propyl, isopropyl, n-butyl, or isobutyl), and $R^7$ and $R^8$ may be alkyl groups having 2 or 3 carbon atoms (e.g., ethyl, n-propyl, or isopropyl). $R^9$ is the residue of a polyol used to prepare the poly(alkyleneoxy)polyamines (i.e., the organic structure that remains if the hydroxyl groups are removed). $R^{13}$ may be branched or linear, and substituted or unsubstituted (although substituents should not interfere with oxyalkylation reactions). The quantity p represents a number greater than or equal to 1, desirably from 1 to 150, or even from 1 to 20. Structures in which p is 2, 3 or 4 may also be especially useful. The quantities q and r represent numbers greater than or equal to zero. The quantity s is greater than two 2, desirably 3 or 4 (so as to provide, respectively, polyoxyalkylene triamines and tetraamines). In some embodiments, p, q, r and s are chosen such that the resulting product is a liquid at room temperature as this simplifies handling and mixing thereof. Usually, poly(alkyleneoxy) polyamines are liquid.

Examples of poly(alkyleneoxy)polyamines include poly (ethylene oxide)diamine, poly(propylene oxide)diamine, poly(propylene oxide)triamine, diethylene glycol propylene diamine, triethyleneglycol propylene diamine, poly(tetramethyleneoxide)diamine, poly(ethylene oxide)-co-poly(propylene oxide)diamine, and poly(ethylene oxide)-co-poly (propylene oxide)triamine.

Examples of suitable commercially available poly(alkyleneoxy)polyamines include those available under the trade designation JEFFAMINE from Huntsman Chemical Company (Salt Lake City Utah) such as the JEFFAMINE D, ED, and EDR series diamines (e.g., D-400, D-2000, D-5000, ED-600, ED-900, ED-2001, and EDR-148), and the JEFFAMINE T series triamines (e.g., T-403), as well as a poly(alkyleneoxy)polyamine available as H221 from Union Carbide Company (Danbury, Conn.).

Useful polyamines also include, for example, amine-terminated oligo- and poly-(diaryl)siloxanes and (dialkyl) siloxanes, amino-terminated polyethylenes or polypropylenes, and amino terminated poly(alkylene oxides). Useful polyamines also include polydialkylsiloxanes with pendent or terminal amino groups. Exemplary commercial polydialkylsiloxanes having terminal or pendent amine groups include those available as: PDMS DIAMINE 5k, 10k, or 15k from 3M Company (Saint Paul, Minn.); TEGOMER A-Si 2120 or 2130 from Th. Goldschmidt (Essen, Germany); DMS-A11, A12, A15, A25, or A32, AMS-132, 152, 162, or 232, or ATM-1112 from Gelest, Inc. (Morrisville, Pa.); or RHODORSIL 21643 and 21644, 21642, or 21637 from Rhodia SA (Courbevoie, France).

Curable compositions according to the present disclosure include at least one polyepoxide (i.e., a compound having at least two epoxy groups). Polyepoxides that may be utilized in practice of the present disclosure include, for example, monomeric polyepoxides, oligomeric polyepoxides, polymeric polyepoxides. Useful polyepoxides include, for example aromatic polyepoxides, alicyclic polyepoxides, and aliphatic polyepoxides. Mixtures of polyepoxides may also be used.

In some embodiments, the at least one polyepoxide includes glycidyl groups.

Examples of polyepoxides containing glycidyl groups include bisphenol A diglycidyl ether, bisphenol F diglycidyl ether, polyglycidyl ethers of polyhydric phenols such as: Bisphenol A-type resins and their derivatives, epoxy cresol-novolac resins, epoxy phenol-novolac resins, and glycidyl esters of aromatic carboxylic acids (e.g., phthalic acid diglycidyl ester, isophthalic acid diglycidyl ester, trimellitic acid triglycidyl ester, and pyromellitic acid tetraglycidyl ester), and N,N,N',N'-tetraglycidyl-4,4'-methylenebisbenzenamine.

Examples of commercially available polyepoxides containing glycidyl groups include those having the trade designation ARALDITE (e.g., ARALDITE MY-720, ARALDITE MY-721, ARALDITE 0510, ARALDITE PY-720, and ARALDITE EPN 1179), available from Huntsman Chemical Company; those having the trade designation EPON RESIN (e.g., EPON RESIN 828, EPON RESIN 826, EPON RESIN 862 and EPON RESIN CS-377) available from Momentive Specialty Chemicals (Houston, Tex.); and aromatic polyepoxides having the trade designations DER (e.g., DER 330), DEN (e.g., DEN 438 and DEN 439).

If any of the at least one polyepoxide has glycidyl groups (i.e., y>0), then the number of glycidyl group equivalents is selected such that it is in a range of from 0.1 to 1 times the number of equivalents (x) of 3-substituted benzoxazine group of glycidyl groups.

In some embodiments, the at least one polyepoxide is free of glycidyl groups. Examples of polyepoxides that are free of glycidyl groups include epoxycyclohexanecarboxylates (e.g., 3,4-epoxycyclohexylmethyl 3,4-epoxycyclohexanecarboxylate (available, for example, under the trade designation ERL-4221 from Dow Chemical Co., 3,4-epoxy-2-methylcyclohexylmethyl 3,4-epoxy-2-methylcyclohexanecarboxylate, bis(3,4-epoxy-6-methylcyclohexylmethyl) adipate, 3,4-epoxy-6-methylcyclohexylmethyl 3,4-epoxy-6-methylcyclohexanecarboxylate (available, for example, under the trade designation ERL-4201 from Dow Chemical Co.); vinylcyclohexene dioxide (available, for example, under the trade designation ERL-4206 from Dow Chemical Co.); bis(2,3-epoxycyclopentyl)ether (available, for example, under the trade designation ERL-0400 from Dow Chemical Co.), bis(3,4-epoxy-6-methylcyclohexylmethyl) adipate (available, for example, under the trade designation ERL-4289 from Dow Chemical Co.), dipenteric dioxide (available, for example, under the trade designation "ERL-4269" from Dow Chemical Co.), 2-(3,4-epoxycyclohexyl-5,1'-spiro-3',4'-epoxycyclohexane-1,3-dioxane, and 2,2-bis(3,4-epoxycyclohexyl)propane.

Curable compositions according to the present disclosure include at least one polythiol selected from the group consisting of

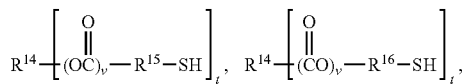

-continued

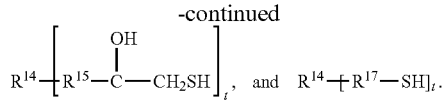

In the foregoing structures, v is 0 or 1, and t is an integer in a range of from 1 to 6, inclusive (e.g., 1, 2, 3, 4, 5, or 6). $R^{14}$ is a t-valent hydrocarbyl radical having from 1 to 30 carbon atoms (e.g., from 1 to 20 carbon atoms, or from 1 to 12 carbon atoms). In some embodiments, $R^{14}$ is aliphatic (i.e., not aromatic), while in others it includes at least one (e.g., 1, 2, or 3) aromatic rings.

$R^{15}$ is selected from the group consisting of an alkylene group having from 1 to 30 carbon atoms (e.g., from 1 to 20 carbon atoms, or from 1 to 12 carbon atoms), an oxyalkylene group having from 1 to 30 carbon atoms (e.g., from 1 to 20 carbon atoms, or from 1 to 12 carbon atoms), an hydroxy alkylene group having from 1 to 30 carbon atoms (e.g., from 1 to 20 carbon atoms, or from 1 to 12 carbon atoms), a polyoxyalkylene group having from 4 to 100 carbon atoms (e.g., from 1 to 50 carbon atoms, or from 1 to 12 carbon atoms), and combinations thereof. $R^{16}$ is selected from the group consisting of an alkylene group having from 1 to 30 carbon atoms, an alkyleneoxyalkylene group having from 1 to 30 carbon atoms (e.g., from 1 to 20 carbon atoms, or from 1 to 12 carbon atoms), an alkylenepolyoxyalkylene group having from 4 to 100 carbon atoms (e.g., from 4 to 50 carbon atoms or from 4 to 20 carbon atoms), and combinations thereof. $R^{17}$ is an alkylene group having from 1 to 30 carbon atoms (e.g., from 1 to 20 carbon atoms, or from 1 to 12 carbon atoms).

Examples of useful polythiols include 1,6-hexanedithiol; 1,8-dimercapto-3,6-dithiaoctane; propane-1,2,3-trithiol; ethylene glycol bis(thioglycolate); pentaerythritol tetrakis(3-mercaptopropionate); ethylene glycol bis(3-mercaptopropionate); trimethylolpropane tris(thioglycolate); trimethylolpropane tris(3-mercaptopropionate); and pentaerythritol tetrakis(thioglycolate); pentaerythritol tetrakis (3-mercaptopropionate); and 3,6-dioxa-1,8-octane, $(HSCH_2CH(OH)CH_2OC_6H_4)_2CH_2$, $(HSCH_2CH(OH)CH_2OC_6H_4)_2C(CH_2)_2$, Examples of commercially available polythiols include mercapto hydroxy soybean oil (e.g., as available as PM-358 from Chevron Phillips Chemical Co. (The Woodlands, Tex.)), mercaptanized castor oil (e.g., as POLYMERCAPTAN 805-C from Chevron Phillips Chemical Co.), dipentene dimercaptan, and CAPCURE 3-800 epoxy hardener from Henkel Corp. (Dusseldorf Germany).

Additional polythiols include high molecular weight thiols include polypropylene ether glycol bis(3-mercaptopropionate) which may be prepared from polypropylene-ether glycol (available as PLURACOL P201 from BASF Wyandotte Chemical Corp. (Wyandotte, Mich.)) and 3-mercaptopropionic acid by esterification.

Minor amounts of monothiols may be added to the curable composition; for example, to control the physical properties of the resultant cured composition. If present, such monothiols are typically used in amounts of up to about 0.2 equivalents of thiol groups in the at least one polythiol.

Curable compositions according to the present disclosure generally contain: x equivalents of the at least one 3-substituted benzoxazine (wherein x is a number greater than 0), at least one polyepoxide comprising y equivalents of glycidyl groups (wherein y is a number greater than or equal to 0), and z equivalents of the at least one polythiol (wherein z is a number greater than 0). In some embodiments y is 0.

The values of x, y, and z are selected such that z is in a range of from $0.1(x+y)$ to $(x+y)$. In some embodiments, z is in a range of from $0.1(x+y)$ to $0.3(x+y)$.

In those embodiments wherein there are no glycidyl groups present, the polyepoxide may be present in an amount of from 1 to 50 percent by weight (e.g., from 5 to 30 percent by weight), based on a total weight of the polythiol, polyepoxide, and 3-substituted benzoxazine.

Curable compositions according to the present disclosure may optionally include an acid catalyst to facilitate curing. If present, the acid catalyst is generally present in an amount effective to affect the cure rate of the curable composition (i.e., an effective amount). Typically, such an effective amount is less than about 10 percent by weight, more typically less than about 5 percent by weight, or even less than about 1 percent by weight, based on the total weight of the curable composition.

Examples of suitable acid catalysts include sulfuric acid, hydrogen chloride, hydrogen bromide, hydrogen iodide, trifluoroacetic acid, trichloroacetic acid, p-toluenesulfonic acid, perchloric acid, methanesulfonic acid, 2-aminoethanesulfonic acid, aluminum chloride, zinc chloride, boron trifluoride, antimony pentachloride, dibutyltin dilaurate, and titanium tetrachloride.

In some embodiments, the optional acid catalyst comprises a superacid. Superacids are, by definition, Brønsted acids that are more acidic than 100 percent sulfuric acid. Examples include liquid salts of a substituted pentafluoroantimonic acid having the formula $H^+ SbF_5X^-$ wherein X is halogen, hydroxy, or $-OR^{14}$ wherein foregoing formula is a residue of an aliphatic, alicyclic, or aromatic alcohol having a molecular weight less than about 10,000 grams/mole and a primary or secondary hydroxy functionality of at least 1, desirably at least 2. Examples of $R^{14}$ include 2-hydroxyethoxy and 2-(2'-hydroxyethoxy)ethoxy. Examples of commercially available superacids include trifluoromethanesulfonic acid, and those available as NACURE SUPER XC-7231 CATALYST (an ammonium hexafluoroantimonate) and NACURE SUPER XC-A230 CATALYST (an ammonium hexafluoroantimonate), both from King Industries (Norwalk, Conn.).

Curable compositions according to the present disclosure can generally be prepared by simply combining the components thereof with mixing. In some cases, it may be desirable to warm one or more of the components (e.g., to melt a solid component) prior to combining.

Curing of the curable composition is typically accomplished by heating using a heat source. Examples of suitable heat sources include ovens, hot platens, and infrared radiation.

In some embodiments, the present disclosure provides B-stage compositions (e.g., as adhesive sheets or tapes). Processing applications such as printed circuit manufacture often employ stageable adhesives (i.e., adhesive compositions which can be partially cured to a tacky or tack-free state, disposed on a substrate, and cured—typically using heat and/or pressure). The partially-cured, tack-free state is commonly referred to as the "B-stage".

The physical properties (e.g., viscosity, tack, peel, and/or shear) of uncured, B-stage, and cured compositions can be readily altered through the use of different amounts and types of each component in the curable composition.

Reaction conditions for curing the curable composition depend on the reactants and amounts used and can be determined by those skilled in the art. The curable compositions may generally be made by mixing in any order the benzoxazine compound(s), polyepoxide(s), polythiol(s), and optional catalyst. Generally, the curable composition is then heated to a sufficient temperature (e.g., between about 50° C. and 200° C.) for a time of about 1-120 minutes, although other conditions may also be used.

Suitable heat sources include, for example induction heating coils, ovens, hot plates, heat guns, infrared sources including lasers, microwave sources.

Solvent can be used to assist in preparation and/or coating of the curable composition, and as a processing aid. For example, it may be advantageous to prepare a concentrated solution of the catalyst in a small amount of solvent to simplify the preparation of the polymerizable composition. Exemplary solvents include lactones, such as gamma-butyrolactone, gamma-valerolactone; and epsilon-caprolactone; ketones such as acetone, methyl ethyl ketone, methyl isobutyl ketone, cyclopentanone and cyclohexanone; sulfones, such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2,2'-sulfonyldiethanol; sulfoxides, such as dimethyl sulfoxide; cyclic carbonates such as propylene carbonate, ethylene carbonate and vinylene carbonate; carboxylic acid esters such as ethyl acetate, methyl cellosolve acetate, methyl formate; methylene chloride, nitromethane, acetonitrile, glycol sulfite, and 1,2-dimethoxyethane (glyme).

Adjuvants may optionally be added to the curable composition. Examples include colorants, abrasive granules, anti-oxidant stabilizers, thermal degradation stabilizers, light stabilizers, conductive particles, tackifiers, fillers, flow agents, bodying agents, flatting agents, inert fillers, binders, blowing agents, fungicides, bactericides, surfactants, plasticizers, rubber tougheners and other additives known to those skilled in the art.

Compositions according to the present disclosure are useful; for example, as coatings, foams, shaped articles, adhesives (including structural and semi-structural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, and other applications that are known to those skilled in the art.

In some embodiments, curable compositions according to the present disclosure are disposed on a liner (e.g., if formed into a thermosetting sheet or tape). Referring now to FIG. 1, exemplary article 100 comprises a curable composition 110 according to the present disclosure disposed on first releasable liner 120. In some embodiments, curable composition 110 is sandwiched between first releasable liner 120 and optional first releasable liner 130.

Releasable liners are well-known in the art and include, for example, siliconized paper, and polyolefin films (e.g., polypropylene films). In order to make article 100, curable composition 110 may, for example, be coated onto, or laminated to one or both of the releasable liners.

Objects and advantages of this disclosure are further illustrated by the following non-limiting examples, but the particular materials and amounts thereof recited in these examples, as well as other conditions and details, should not be construed to unduly limit this disclosure.

EXAMPLES

TABLE OF ABBREVIATIONS

| | |
|---|---|
| BNZOX | ARALDITE MT 35600 bisphenol-A—based benzoxazine obtained from Huntsman Corp. LLC, Salt Lake City, Utah |
| CAT 1 | ammonium antimony hexafluoride catalyst (a superacid catalyst) obtained as NACURE SUPER XC-7231 from King Industries, Inc., Norwalk, Connecticut |
| CAT 2 | diethylene glycol/antimony pentafluoride adduct (superacid catalyst), prepared according to the method of U.S. Pat. No. 5,280,067 (Tarbutton et al.) |
| EPOXY 1 | bisphenol-A diglycidyl ether, obtained as EPON 828 from Hexion Specialty Chemicals, Houston, Texas |
| EPOXY 2 | 3,4-epoxycyclohexylmethyl 3,4-epoxycyclohexyl carboxylate, obtained as ERL-4221 from Dow Chemical Co., Midland, Michigan |
| EPOXY 3 | epoxypropoxypropyl-terminated poly(dimethylsiloxane), obtained as DMS-E09 from Gelest, Inc. |
| P-2600 | a core-shell impact modifier (toughener), obtained as PARALOID EXL-2600 from Dow Chemical Co., Midland, Michigan |
| THIOL 1 | a 3:1 blend of QX-11 (a thiolated EPON 828, obtained from Japan Epoxy Resins Co., Ltd., of Tokyo, Japan) with a core-shell toughener, obtained from Kaneka Texas Corp., Pasadena, Texas |
| THIOL 2 | trimethylolpropane tri-3-mercaptopropionate, obtained as THIOCURE TMPMP from Bruno Bock Thio-Chemical-S, Marschacht, Germany |
| THIOL 3 | (mercaptopropyl)methylsiloxane—dimethylsiloxane copolymer, obtained as SMS-042 from Gelest, Inc., Morrisville, Pennsylvania |
| THIOL 4 | a polysulfide was prepared as follows: P-2600 core-shell toughener was added at 1 part by weight to 2 parts by weight of THIOL 2, at room temperature, and the mixture was stirred vigorously overnight using a mechanical stirrer. The mixture turned translucent, indicating good mixing. |

Procedures and Test Methods

Except where specified to the contrary, amounts are given in equivalents (eq). Equivalents are based on the moles of reactive groups per mole of reactant molecule. Hence, 2 equivalents of a bifunctional reactant represents one mole of that reactant, and one mole of a trifunctional reactant would represent 3 eq of that reactant. Catalysts are treated as if monofunctional.

Differential Scanning calorimetry (DSC) was performed on an aliquot of a given reaction mixture which was placed into an open aluminum DSC pan and heated at 10° C./min from 25° C. to 300° C. in a Differential Scanning calorimeter (Seiko Instruments USA, Inc., Torrance, Calif.).

Cohesive Strength was measured using the Overlap Shear Strength Test (OLS). Overlap, or "lap", shear specimens were made using 4 in×7 in×0.063 in (10 cm×18 cm×0.16 cm) 7075 T6 bare aluminum that had been anodized according to Boeing Aircraft Company Specification BAC-5555. The anodization voltage was 22.5 volts. The specimen was generated as described in ASTM Test Method D-1002. The specific thermal coating conditions varied, as described below in each Example. Generally, a strip of approximately 0.5 in (1.3 cm)×0.15 mm of adhesive was applied to one edge of each of the two adherends using a scraper. Three 75-micron diameter piano wires were used as spacers for bondline thickness control. The bond was closed and taped on the edge. The bond was placed between sheets of aluminum foil and pieces of cardboard. Two 14 lb (6.4 kg) steel plates were used to apply pressure to provide for adhesive spreading. After the adhesive had been allowed to cure (as described in each Example), the large specimen was cut into 1 in (2.5 cm) wide smaller specimens, providing a 0.5 in² (3.2 cm²) bonded area. Six lap shear specimens were obtained from each larger specimen. The bonds were tested to failure at room temperature on a SINTECH Tensile Testing machine (MTS, Eden Prairie, Minn.), using a crosshead displacement rate of 0.1 in/min. The failure load was recorded. The lap width was measured with a vernier caliper. The quoted lap shear strengths are calculated as (2 times the failure load)/(measured width). The average (mean) and standard deviation were calculated from the results of six tests.

Adhesive peel was determined using the T-peel test (T-peel). T-peel values were measured using 4 in×8 in×0.025 in (10 cm×20 cm×64 mm) 7075 T6 bare aluminum that had been anodized according to Boeing Aircraft Company Specification BAC-5555. The anodization voltage was 22.5 volts. The test was as described in ASTM D-1876; Standard Test Method for Peel Resistance of Adhesives "T-Peel Test," Annual Book of ASTM Standards, vol. 15.06, pp. 115-117 (1995). A strip of adhesive, 2 in×5 in×10 mils (5 cm×13 cm×25 microns), prepared in a given Example was applied to both of the two anodized aluminum adherends. 10-Mil (25-micron) thick spacers made from brass shims were applied to the edges of the bonded area for bondline thickness control. The bond was closed and adhesive tape was applied to hold the adherends together during the cure. The adhesive bonds were placed between sheets of aluminum foil and also between pieces of cardboard. Four 14 lb (6.4 kg) steel plates were used to apply pressure to provide for adhesive spreading. The assembly was placed into an oven heated to 130° C. for 1 hour. After the adhesive had been allowed to cool to room temperature, the larger specimen was cut into 1 in (2.5 cm) wide samples, yielding two 1 in (2.5 cm) wide specimens. The bonds were tested to failure at room temperature on a Sintech Tensile Testing machine using a crosshead displacement rate of 12 in/min (30 cm/min). The initial part of the loading data was ignored. The average load was measured after about 1 in (2.5 cm) was peeled. The T-peel strength is the average of three peel measurements was 2.2 lb/in (3.8 N/cm).

Dynamical Mechanical Analysis (DMA) was performed as follows. A given reaction mixture was deposited in a rectangular silicone rubber mold, sandwiched between two silicone release liner coated PET sheets and pressed between glass plates. The mold consisted of ten 1 mm thick sheet with rectangular cutouts (5 mm×30 mm) to prepare specimens for dynamic mechanical analysis. The clamped construct was then placed in an oven at 130° C. for 30 minutes. The assembly was then allowed to cool to room temperature. Dynamic mechanical analysis was run on a Seiko Dynamic Mechanical Analyzer (DMA) in tensile mode at the temperature range between −80° C. and 260° C. at a heating rate of 2° C./min. Storage modulus (E'), loss modulus (E"), and loss tangent were recorded.

Example 1

Figure 2:
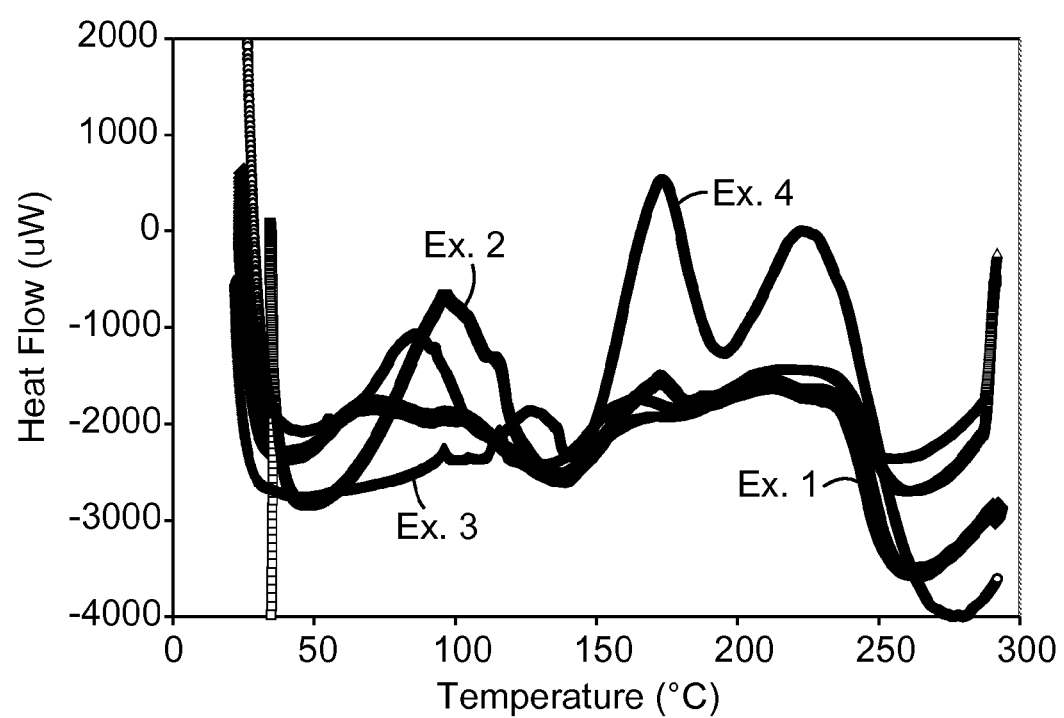
FIG. 2 is a plot of heat flow versus temperature as measured by differential scanning calorimetry.

To a mixture of 2.08 g (0.009 mol, 9 eq of benzoxazine) of finely ground BNZOX and 0.2 g (0.001 mol or 1 eq of epoxide) of EPOXY 1 was added 2.95 g (0.01 mol, 10 eq of thiol) of THIOL 1 at room temperature. The components were stirred to a uniform mass, and an aliquot was taken to obtain the DSC trace labeled Ex. 1 in FIG. 2.

Without wishing to be bound by theory, the first broad curing peak, at about 60° C. to 80° C., is believed to be caused by thiol reaction with glycidyl epoxide functionality. This reaction appears already to be underway at room temperature. Following that portion of the cure, a B-Staged adhesive is obtained. It can be further cured, as evidenced by the peak at about 175° C. This peak is believed to be the result of benzoxazine ring opening by thiol. The third curing peak at about 220° C. is believed to be the result of benzoxazine homopolymerization after the thiol functionality is exhausted.

Example 2

To a mixture of 2.31 g (0.01 mol of benzoxazine) of finely ground BNZOX and 1.75 g (25 percent of the total weight of reactants) of EPOXY 2 was added 2.95 g (0.01 mol of thiol) of THIOL 1 at room temperature. The components were stirred to a uniform mass, and an aliquot was taken to obtain the DSC trace labeled Ex. 2 in FIG. 2.

Without wishing to be bound by theory, it is believed that the later onset of the first curing peak, compared to that of Example 1, is caused by the difference between reactivity of the glycidyl epoxide, used in Example 1, and the cycloaliphatic epoxides used in Example 2. The peak has a maximum at about 97° C., and may represent a combination of thiol-benzoxazine reactions and epoxides homopolymerization. The B-Stage curing peaks at higher temperatures appear similar to those of Example 1.

Example 3

To a mixture of 2.31 g (0.01 mol of benzoxazine) of finely ground BNZOX and 0.58 g (10 percent of the total weight of reactants) of EPOXY 2 was added 2.95 g (0.01 mol of thiol) of THIOL 1 at room temperature. The components were stirred to a uniform mass. The reaction mass was held for two days at room temperature, and then an aliquot was taken to obtain the DSC trace labeled Ex. 3 in FIG. 2.

Without wishing to be bound by theory, it is believed that the lack of a significant curing peak below 130° C. is the result of having held the specimen at room temperature for two days, allowing the curing to a B-Stage adhesive to occur slowly but almost completely without heating. Once again, the two B-Stage curing peaks at higher temperatures appear similar to those of Examples 1 and 2.

Example 4

A mixture of 2.31 g (0.01 mol, 100 eq of benzoxazine) of finely ground BNZOX and 0.5 g (10 percent of the total weight of reactants) of EPOXY 2 was added to a mixture of 0.055 g (1 percent of the total weight of reactants) of CAT 1 dissolved in 2.46 g (0.0083 mol, 83 eq of thiol) of THIOL 1 and 0.22 g (0.0017 mols, 17 eq of thiol) of THIOL 2 at room temperature. The components were stirred to a uniform mass, and an aliquot was taken to obtain the DSC trace labeled Ex. 4 in FIG. 2.

Without wishing to be bound by theory, it is believed that the addition of the superacid catalyst in Example 4 produces two effects. The onset of the first stage of cure is shifted to lower temperature, and the curing of the B-Stage adhesive becomes sharper and more pronounced.

Examples 5-8

Four benzoxazine adhesive compositions were prepared in order to assess their adhesive properties.

For Examples 5 and 6, EPOXY 2 was used as the epoxide component. For Examples 7 and 8, EPOXY 1 was used as the epoxide component. For each of Examples 5-8, one equivalent of the epoxide component was admixed with 9 eq of BNZOX and heated to 100° C. for 30 minutes with stirring. For examples 5 and 6, nine equivalents of THIOL 4 and THIOL 1, respectively, were added to the mixture of epoxide and benzoxazine at 100° C. For examples 7 and 8, ten equivalents of THIOL 4 and THIOL 1, respectively, were added the mixture of epoxide and benzoxazine at 100° C. The compositions employed in Examples 5 through 8 are summarized in Table 1 (below).

TABLE 1

| EPOXY/THIOL | THIOL 4 | THIOL 1 |
|---|---|---|
| EPOXY 2 | Example 5 | Example 6 |
| EPOXY 1 | Example 7 | Example 8 |

The reactive compositions were deposited between two silicone coated polyester liners and a 125-micron thick film was made by pulling the sandwich structure through a "hot knife" at 100° C. The film so created was used to prepare specimens for Overlap Shear and T-peel tests, described above. Curing of some test specimens of Example 5 and Example 7 was performed at 190° C. for 2 hours, and these were designated specimens 5a and 7a. Curing of some test specimens of all four Examples was performed at 155° C. for 10 hours, and these were designated Examples 5b, 6b, 7b, and 8b. Overlap shear and T-peel tests were performed as described above. The results are reported in Table 2 (below).

TABLE 2

| | OVERLAP SHEAR | | | T-PEEL |
|---|---|---|---|---|
| EXAMPLE | average psi (MPa) | std. dev., psi (MPa) | max. psi (MPa) | average lb/in, (N/cm) |
| 5a | 3570 (24.61) | | 4610 (31.78) | 0.8 (9) |
| 5b | 5930 (40.89) | 195 (1.34) | 6292 (43.38) | 3.7 (42) |
| 6b | 1946 (13.42) | 291 (2.01) | 3008 (20.74) | 0.5 (6) |
| 7a | 3282 (22.63) | | 4200 (28.96) | 1.2 (14) |
| 7b | 1629 (11.23) | 133 (0.92) | 2037 (14.04) | 3.5 (40) |
| 8b | 2862 (19.73) | 434 (2.99) | 4278 (29.50) | 0.7 (8) |

Examples 9-12

Example 9 was prepared as follows: 10 parts by weight of THIOL 3 and 90 parts by weight of THIOL 4 were combined with mixing at 80° C. To this mixture was added an equal equivalent amount of BNZOX with mixing at 100° C.

Example 10 was prepared as follows: 10 parts by weight of THIOL 3 and 90 parts by weight of THIOL 1 were combined with mixing at 80° C. To this mixture was added an equal equivalent amount of BNZOX with mixing at 100° C.

Example 11 was prepared as follows: 9 parts by weight of BNZOX was combined with one part by weight of EPOXY 3 with mixing at 100° C. for 10 minutes with stirring to achieve uniformity. To this mixture was added an equal equivalent amount of THIOL 4 with mixing at 100° C.

Example 12 was prepared as follows: 9 parts by weight of BNZOX was combined with one part by weight of EPOXY 3 with mixing at 100° C. for 10 minutes with stirring to achieve uniformity. To this mixture was added an equal equivalent amount of THIOL 1 with mixing at 100° C.

The above compositions were deposited between two silicone coated polyester liners and a 125 micron thick film was made by pulling the sandwich structure through a "hot knife" at 100° C. The film so created was used to prepare specimens for Overlap Shear and T-peel tests, described above. Curing of the test specimens was performed at 150° C. for 2 hours. Overlap shear and T-peel tests were performed as described above. The results are reported in Table 3 (below).

TABLE 3

| | OVERLAP SHEAR | | | T-PEEL | |
|---|---|---|---|---|---|
| EXAMPLE | psi (MPa) | max. psi (MPa) | std. dev., psi (MPa) | average lb/in, (N/cm) | std. dev., lb/in (N/cm) |
| 9 | 2109 (14.54) | 2627 (18.11) | 690 (4.75) | 5.8 (66) | 2.0 (23) |
| 10 | 2265 (15.62) | 2600 (17.93) | 248 (1.71) | 18.5 (209) | 0.92 (10) |
| 11 | 4009 (27.64) | 4514 (31.12) | 644 (4.44) | 3.1 (35) | 0.23 (2.6) |
| 12 | 3367 (23.21) | 4336 (29.90) | 774 (5.34) | 4.2 (48) | 0.5 (6) |

T-peel values were considerably higher than those observed for Examples 5-8.

Figure 3:
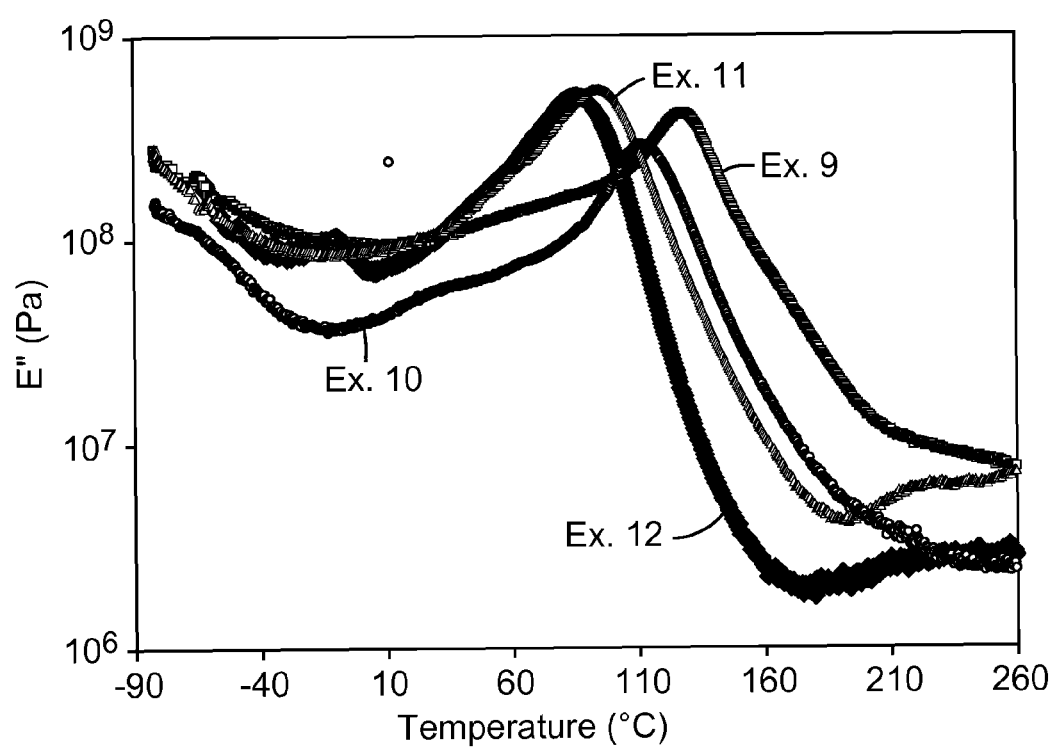
FIG. 3 shows plots of loss modulus (E") versus temperature as measured by dynamic mechanical analysis.
Figure 4A:
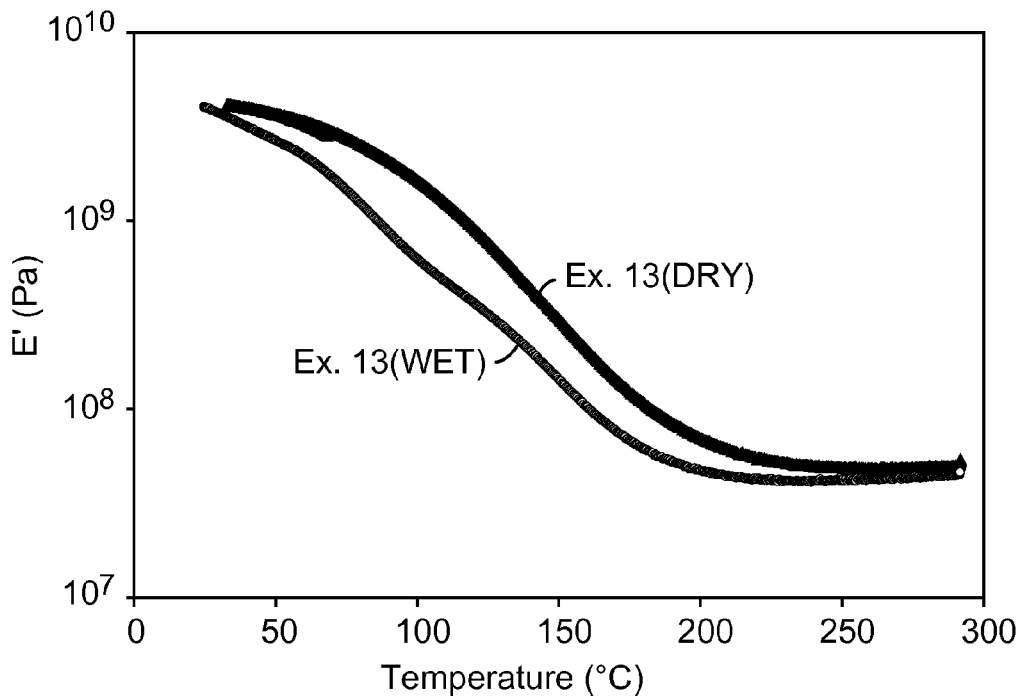
FIGS. 4A-4D are plots of storage modulus (E') versus temperature as measured by dynamic mechanical analysis.
Figure 4B:
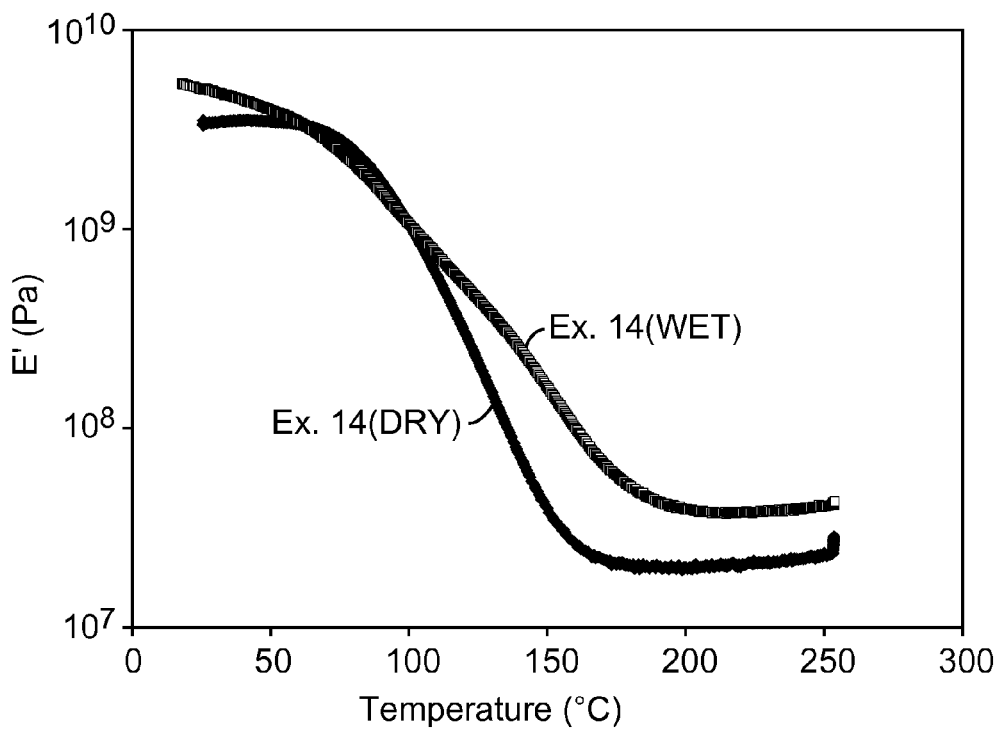
Figure 4C:
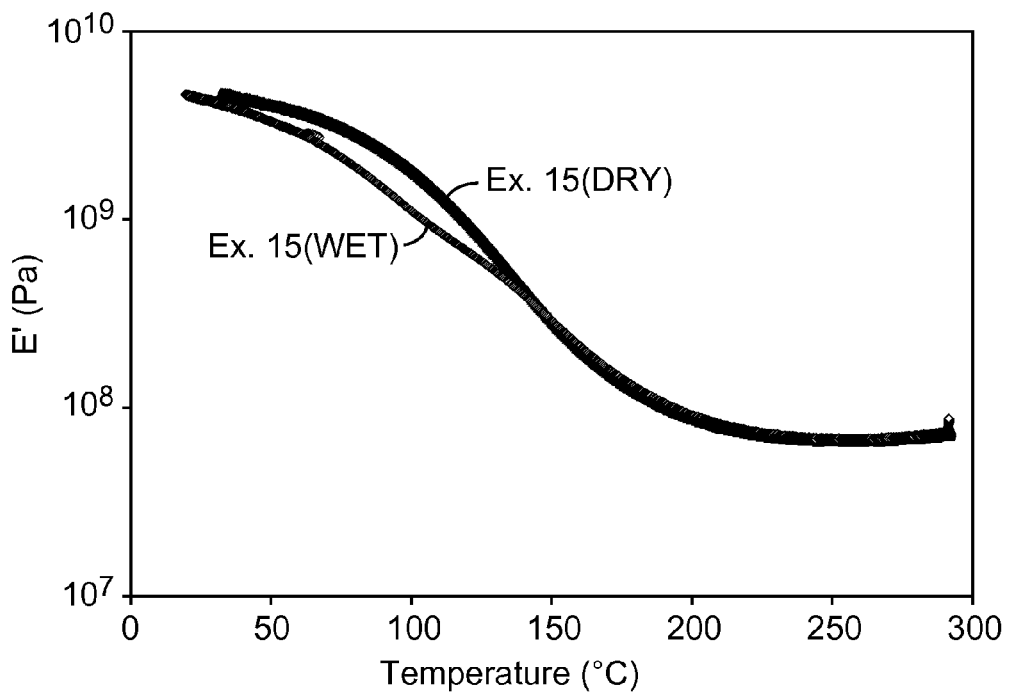
Figure 4D:
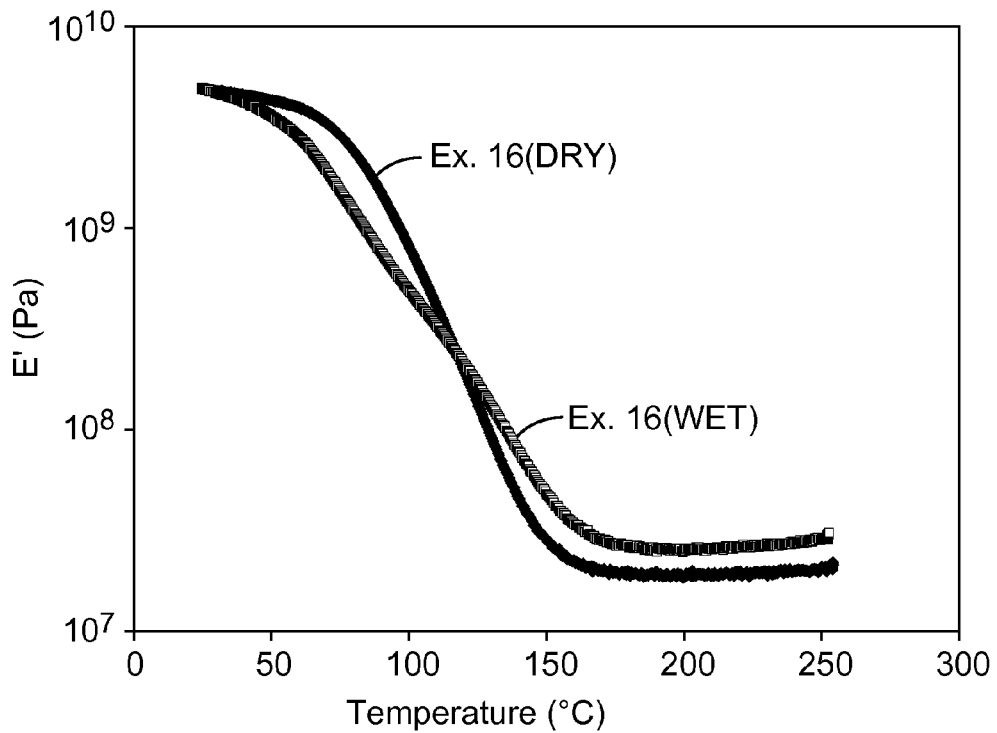
Figure 5A:
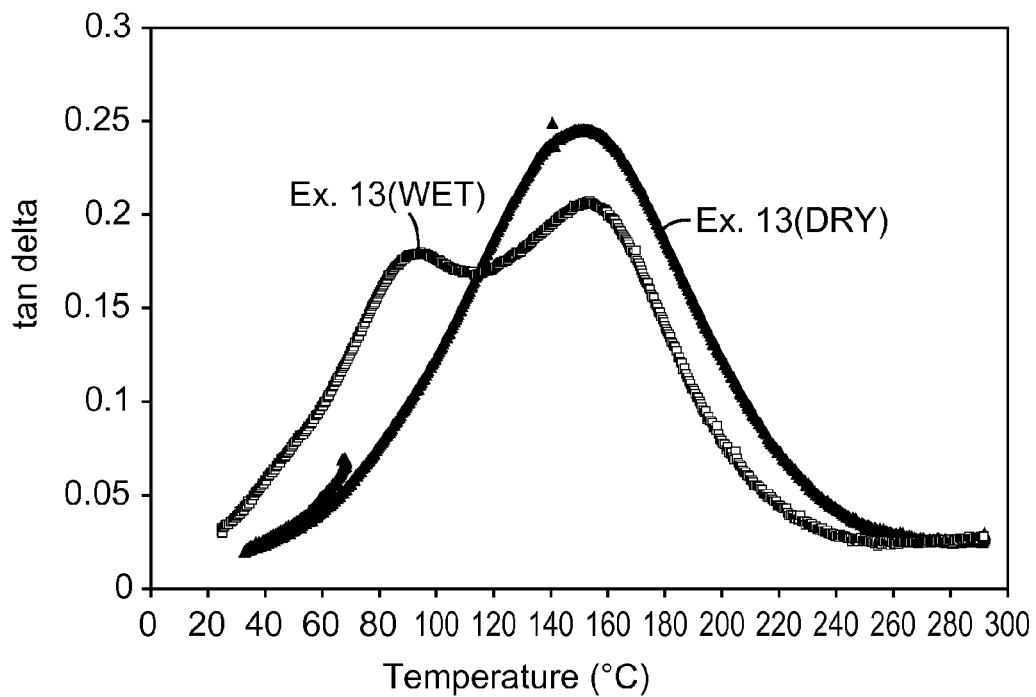
FIGS. 5A-5D are plots of loss tangent versus temperature as measured by dynamic mechanical analysis.
Figure 5B:
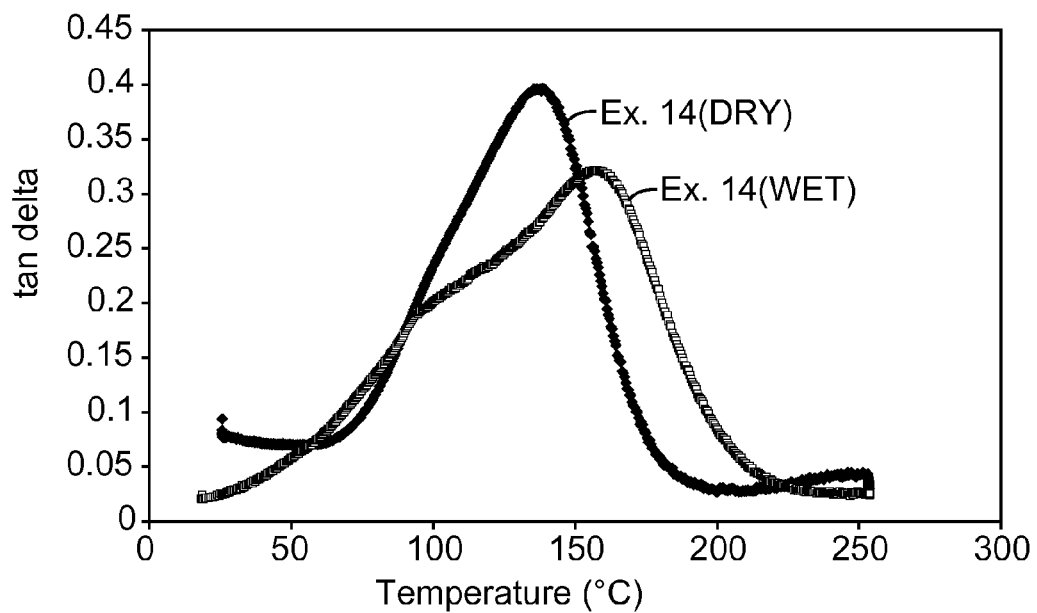
Figure 5C:
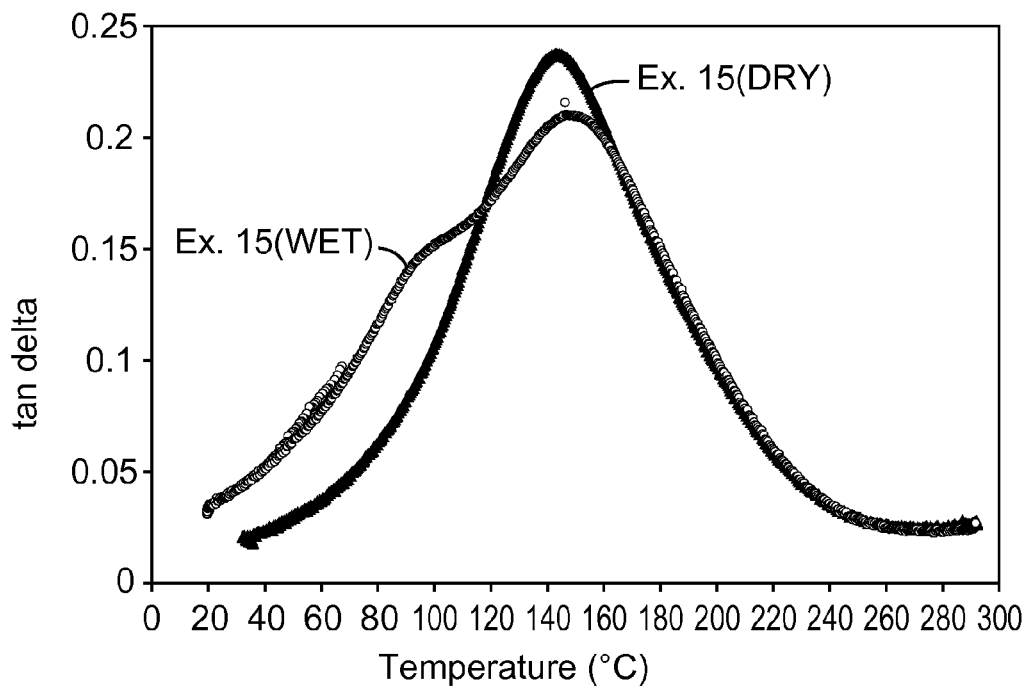
Figure 5D:
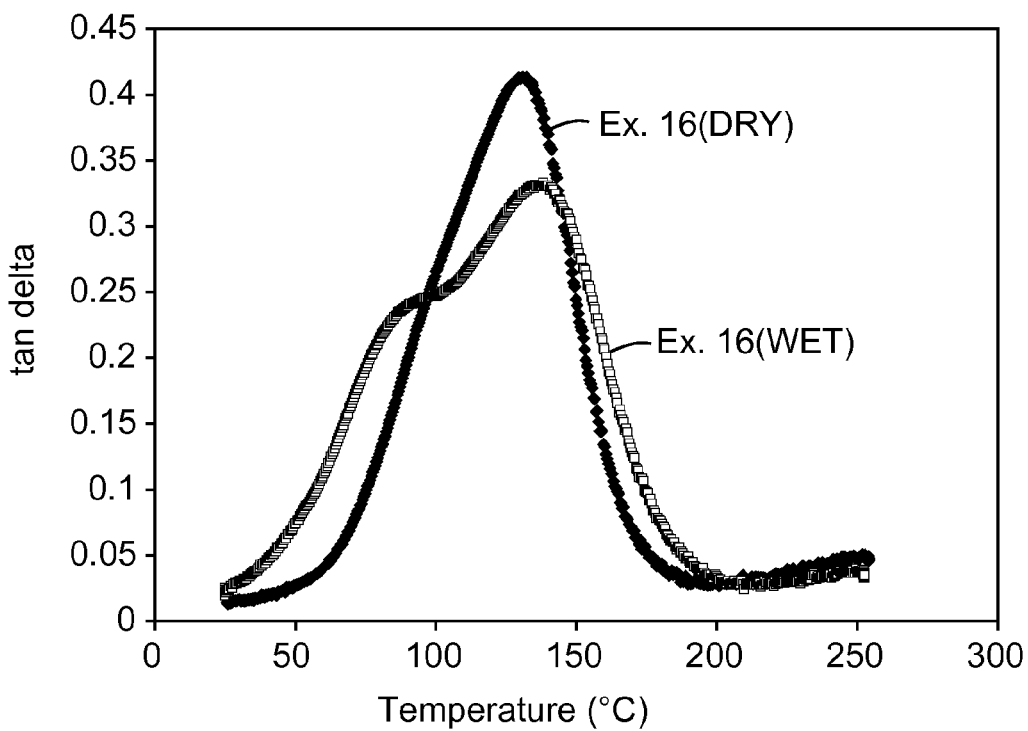

Dynamic Mechanical Analysis of each of the compositions of Examples 9-12 was performed as described above. The loss modulus data for each is shown in FIG. 3. For each composition, the high-temperature end of a loss peak having a maximum at a temperature lower than −80° C. was observed. This is evidence of the incorporation of the siloxane moieties introduced in two ways—one an epoxide route, and one a thiol route—in Examples 9-12. The increased flexibility is likely responsible for the improved T-peel values.

Examples 13-16

The effect of moisture, especially under hot conditions, can be deleterious to high temperature adhesives. If the adhesive loses modulus due to water uptake, its use in structural applications becomes problematic. Adhesives of the present invention combine the proven moisture resistance of sulfur-containing organics with the excellent moisture resistance of benzoxazines. The effect on moisture resistance of the addition of 10 percent by weight of the corresponding epoxide was investigated in hot-wet tests.

For Examples 13-16, respectively, the compositions of Examples 5-8 were admixed at 100° C. as before. For each, the mixture was poured into a 1 mm thick silicone rubber mold, sandwiched between two silicone coated PET liners and pressed between two pieces of glass. The constructs were then placed in the oven and cured at 150° C. for 2 hours, removed from the mold. Two specimens were prepared in this way for each Example, and each of the eight specimens was post-cured using a 2° C./min temperature ramp, to 280° C., in the DMA, and cooled to room temperature. One specimen of each Example (designated "WET") was then placed into boiling water under reflux for 24 hours, blotted dry, and then evaluated in DMA tension mode. The other specimen of each Example (designated "DRY") was evaluated, without any further treatment, in DMA tension mode. All four compositions performed fairly well in this test, with only the composition of Example 13 showing much loss of modulus.

FIGS. 4a-4d show the storage modulus, "WET" and "DRY", for Examples 13-16, respectively. For Example 13, one sees that the storage modulus is minimally decreased by the boiling water treatment. Example 15 is practically unchanged by the boiling water treatment. Example 16 exhibits a slight decrease in storage modulus at low temperatures as a result of the boiling water treatment, but a slight increase in storage modulus at higher temperatures, with the cross-over occurring just above 100° C. Example 14 exhibits roughly unchanged storage modulus up to 100° C. as a result of the boiling water treatment, but a significant rise in the storage modulus at temperatures over 100° C. Without wishing to be bound by theory, it is believed that the increase in storage modulus exhibited by the specimens of Examples 14 and 16 may be due to additional curing taking place at 100° C. during the immersion in boiling water, which would be a desirable property in some applications.

FIGS. 5a-5d show the loss tangent, or tan delta, "WET" and "DRY", for Examples 13-16, respectively. The peak in tan delta is generally regarded to be a measure of the glass transition temperature, $T_g$. Each of the "DRY" specimens exhibited a single $T_g$, which varied slightly from composition to composition. Each of the "WET" specimens exhibited a double peak, with the smaller peak shifted to lower temperature, and the larger appearing at the same temperature (Example 13), and slightly higher temperature (Example 15), a somewhat higher temperature (Example 16), and a significantly higher temperature (Example 14). Without wishing to be bound by theory, it is believed that this, too, is evidence of additional curing taking place in boiling water for at least the compositions which contain THIOL 1 thiol. This may be due to the presence of ester linkages in polymers derived from the THIOL 4 thiol, and the absence of ester linkages in polymers derived from the THIOL 1 thiol.

Examples 17-27

Eleven compositions were prepared using procedures identical to those of the previous examples, in order to show the wide range of advantageous high $T_g$ values that can be achieved in adhesives of the present invention, when using a curing cycle of very brief duration. Reaching a high $T_g$ within a short curing cycle is advantageous in many applications. Compositions were as reported in Table 4 (below), wherein amounts are given in equivalents.

TABLE 4

| EXAMPLE | BNZOX | EPOXY 2 | THIOL 1 | THIOL 4 | CAT 1 | CAT 2 |
|---|---|---|---|---|---|---|
| 17 | 85 | 30 | 85 | 0 | 6 | 0 |
| 18 | 75 | 50 | 75 | 0 | 6 | 0 |
| 19 | 93 | 14 | 93 | 0 | 6 | 0 |
| 20 | 75 | 50 | 0 | 75 | 6 | 0 |
| 21 | 100 | 0 | 0 | 100 | 6 | 0 |
| 22 | 75 | 50 | 0 | 75 | 2 | 0 |
| 23 | 85 | 30 | 85 | 0 | 2 | 0 |
| 24 | 85 | 30 | 85 | 0 | 0 | 6 |

TABLE 4-continued

| EXAMPLE | BNZOX | EPOXY 2 | THIOL 1 | THIOL 4 | CAT 1 | CAT 2 |
|---|---|---|---|---|---|---|
| 25 | 75 | 50 | 75 | 0 | 6 | 0 |
| 26 | 85 | 30 | 85 | 0 | 0 | 2 |
| 27 | 85 | 30 | 0 | 85 | 6 | 0 |

Figure 6:
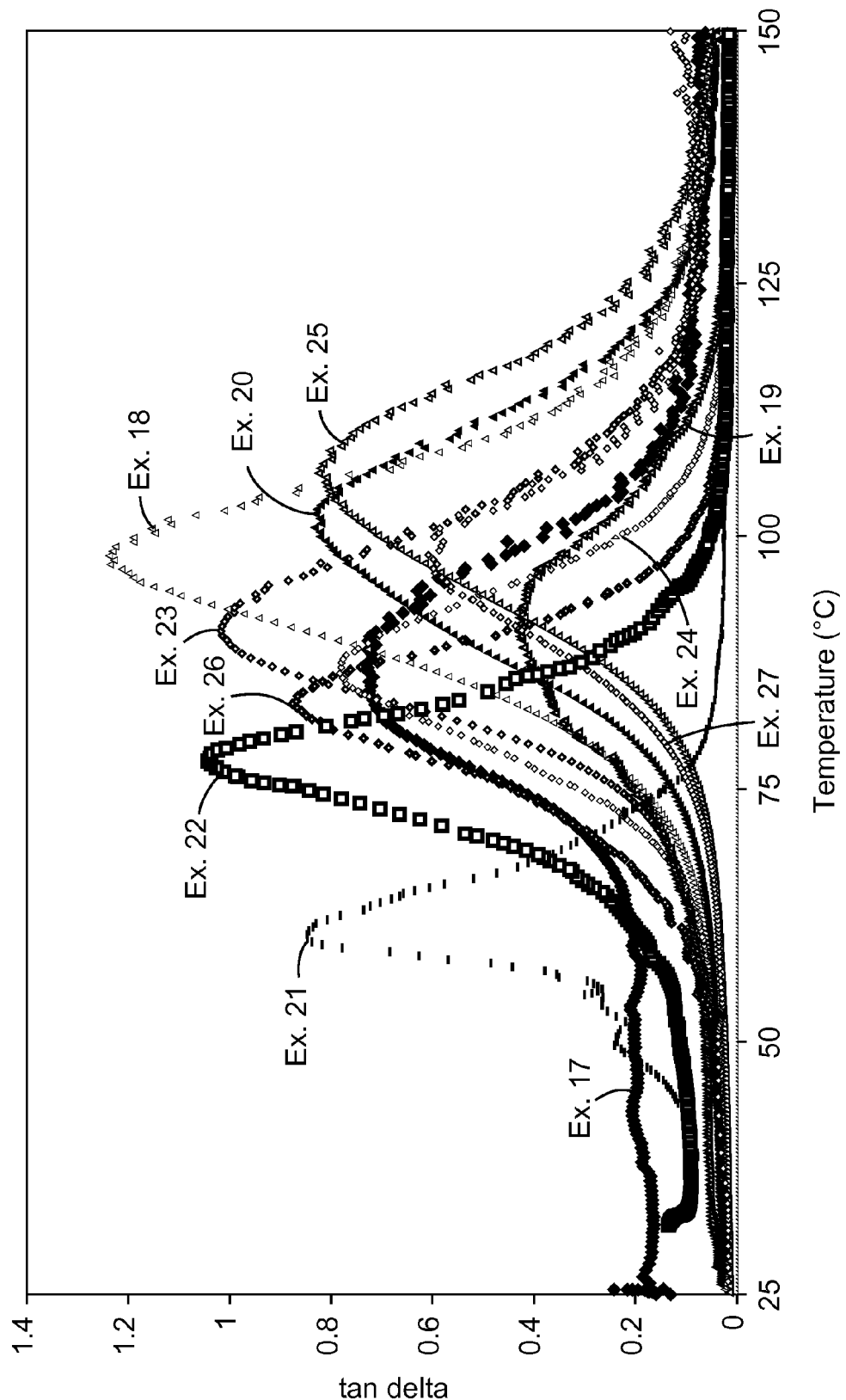
FIG. 6 is a plot loss tangent versus temperature as measured by dynamic mechanical analysis.

Each composition was cured for 10 minutes at 150° C. Dynamic Mechanical Analysis was performed as described above. FIG. 6 shows the tan delta data for each of Examples 17-27. Example 21 is the only member of this set of Examples that was made without any epoxide component. It exhibited the lowest $T_g$, with a loss tangent peak at about 61° C. FIG. 6 shows that the Benzoxazine-Thiol-Epoxide compositions, Examples 17-20 and 22-27, exhibited a broad range of elevated $T_g$ values, as evidenced by the loss tangent peaks ranging from about 78° C. for Example 22 to about 107° C. for Example 25. It is believed that by adjusting the type of thiol component, the catalyst and catalyst level, and the proportions of benzoxazine, epoxide, and thiol components, the range of $T_g$ values achievable should be both continuous and at least slightly wider than exhibited by these Examples.

Select Embodiments of the Present Disclosure

In a first embodiment, the present disclosure provides a curable composition comprising:
x equivalents of at least one 3-substituted benzoxazine, wherein x is a number greater than 0;
at least one polyepoxide, wherein the at least one polyepoxide contains y equivalents of glycidyl groups, wherein y is a number greater than or equal to 0; and
z equivalents of at least one polythiol selected from the group consisting of

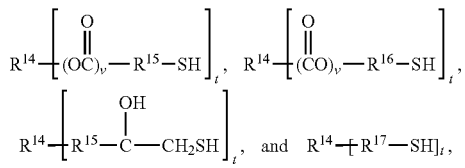

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, an hydroxy alkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
$R^{17}$ is an alkylene group having from 1 to 30 carbon atoms,
wherein z is a number greater than 0, and wherein z is in a range of from 0.1(x+y) to (x+y).

In a second embodiment, the present disclosure provides a curable composition according to the first embodiment, wherein z is in a range of from 0.1(x+y) to 0.3(x+y).

In a third embodiment, the present disclosure provides a curable composition according to the first or second embodiment, wherein y is in a range of from 0.1x to x.

In a fourth embodiment, the present disclosure provides a curable composition according to any one of the first to third embodiments, wherein the at least one polyepoxide comprises a polyepoxide having glycidyl groups.

In a fifth embodiment, the present disclosure provides a curable composition according to any one of the first to fourth embodiments, wherein the at least one polyepoxide comprises a polyepoxide free of glycidyl groups.

In a sixth embodiment, the present disclosure provides a curable composition according to any one of the first to fifth embodiments, further comprising an acid.

In a seventh embodiment, the present disclosure provides a curable composition according to any one of the first to sixth embodiments, wherein the acid comprises a superacid.

In an eighth embodiment, the present disclosure provides a curable composition according to any one of the first to seventh embodiments, wherein the curable composition comprises a B-stage curable composition.

In a ninth embodiment, the present disclosure provides a method of curing a composition, the method comprising:
providing a curable composition comprising:
x equivalents of at least one 3-substituted benzoxazine, wherein x is a number greater than 0;
at least one polyepoxide, wherein the at least one polyepoxide contains y equivalents of glycidyl groups, wherein y is a number greater than or equal to 0; and
z equivalents of at least one polythiol selected from the group consisting of

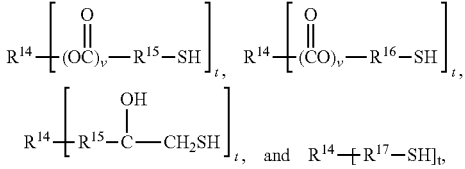

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, an hydroxy alkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
$R^{17}$ is an alkylene group having from 1 to 30 carbon atoms,
wherein z is a number greater than 0, and wherein z is in a range of from 0.1(x+y) to (x+y); and curing the curable composition.

In a tenth embodiment, the present disclosure provides a method according to the ninth embodiment, wherein z is in a range of from $0.1(x+y)$ to $0.3(x+y)$.

In an eleventh embodiment, the present disclosure provides a method according to the ninth or tenth embodiment, wherein y is in a range of from $0.1x$ to $x$.

In a twelfth embodiment, the present disclosure provides a method according to any one of the ninth to eleventh embodiments, wherein the at least one polyepoxide comprises a polyepoxide having glycidyl groups.

In a thirteenth embodiment, the present disclosure provides a method according to any one of the ninth to twelfth embodiments, wherein the at least one polyepoxide comprises a alicyclic polyepoxide free of glycidyl groups.

In a fourteenth embodiment, the present disclosure provides a method according to any one of the ninth to thirteenth embodiments, wherein the curable composition further comprises a superacid.

In a fifteenth embodiment, the present disclosure provides a tack-free reaction product of a curable composition, the curable composition comprising:

x equivalents of at least one 3-substituted benzoxazine, wherein x is a number greater than 0;

at least one polyepoxide, wherein the at least one polyepoxide contains y equivalents of glycidyl groups, wherein y is a number greater than or equal to 0; and z equivalents of at least one polythiol selected from the group consisting of

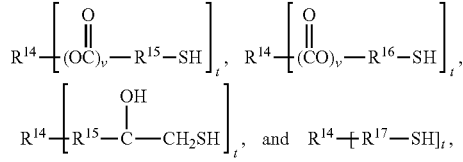

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, an hydroxy alkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
$R^{17}$ is an alkylene group having from 1 to 30 carbon atoms,
wherein z is a number greater than 0, and wherein z is in a range of from $0.1(x+y)$ to $(x+y)$.

In a sixteenth embodiment, the present disclosure provides a tack-free reaction product according to the fifteenth embodiment, wherein z is in a range of from $0.1(x+y)$ to $0.3(x+y)$.

In a seventeenth embodiment, the present disclosure provides a tack-free reaction product according to the fifteenth or sixteenth embodiment, wherein y is in a range of from $0.1x$ to $x$.

In an eighteenth embodiment, the present disclosure provides a tack-free reaction product according to any one of the fifteenth to seventeenth embodiments, wherein the at least one polyepoxide comprises a polyepoxide having glycidyl groups.

In a nineteenth embodiment, the present disclosure provides a tack-free reaction product according to any one of the fifteenth to eighteenth embodiments, wherein the at least one polyepoxide comprises a polyepoxide free of glycidyl groups.

In a twentieth embodiment, the present disclosure provides a tack-free reaction product according to any one of the fifteenth to nineteenth embodiments, wherein the components further comprise an acid.

In a twenty-first embodiment, the present disclosure provides a tack-free reaction product according to any one of the fifteenth to twentieth embodiments, wherein the acid comprises a superacid.

In an eighteenth embodiment, the present disclosure provides an article comprising a curable composition disposed on a first releasable liner, wherein the curable composition comprises:

x equivalents of at least one 3-substituted benzoxazine, wherein x is a number greater than 0;

at least one polyepoxide, wherein the at least one polyepoxide contains y equivalents of glycidyl groups, wherein y is a number greater than or equal to 0; and z equivalents of at least one polythiol selected from the group consisting of

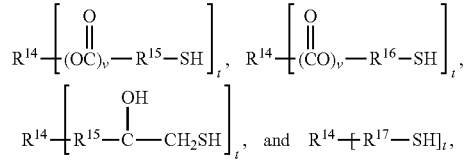

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, an hydroxy alkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
$R^{17}$ is an alkylene group having from 1 to 30 carbon atoms,
wherein z is a number greater than 0, and wherein z is in a range of from $0.1(x+y)$ to $(x+y)$.

In a twenty-second embodiment, the present disclosure provides an article according to the twenty-first embodiment, wherein the curable composition is sandwiched between the first releasable liner and a second releasable liner.

All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A curable composition comprising:

x equivalents of at least one 3-substituted benzoxazine, wherein x is a number greater than 0, wherein the at least one 3-substituted benzoxazine is selected from the group consisting of

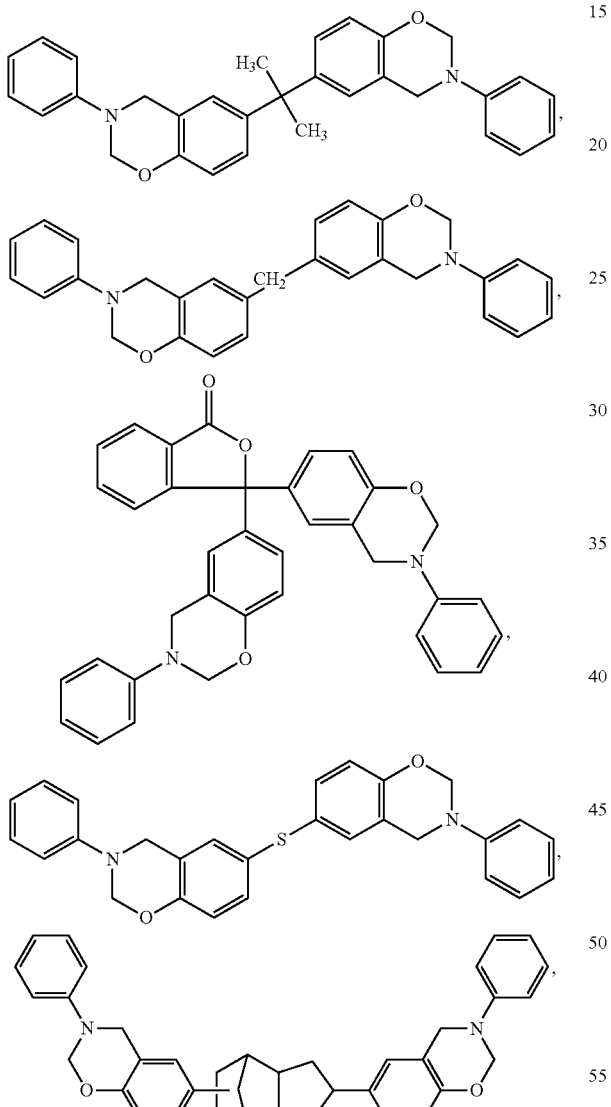

and combinations thereof;

at least one polyepoxide, wherein the at least one polyepoxide contains y equivalents of glycidyl groups, wherein y is a number greater than or equal to 0; and z equivalents of at least one polythiol selected from the group consisting of

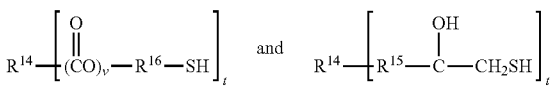

wherein v is 0 or 1;

t is an integer in a range of from 1 to 6, inclusive;

$R^{14}$ is a t-valent hydrocarbyl radical having from 1 to 30 carbon atoms; and $R^{15}$ is selected from the group consisting of an alkylene group having from 1 to 30 carbon atoms, a hydroxyalkylene group having from 1 to 30 carbon atoms, an oxyalkylene group having from 1 to 30 carbon atoms, a polyoxyalkylene group having from 4 to 100 carbon atoms, and combinations thereof;

$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and wherein z is a number greater than 0, and wherein z is in a range of from 0.1(x+y) to (x+y).

2. A curable composition according to claim 1, wherein z is in a range of from 0.1(x+y) to 0.3(x+y).

3. A curable composition according to claim 1, wherein y is in a range of from 0.1x to x.

4. A curable composition according to claim 1, wherein the at least one polyepoxide comprises a polyepoxide having glycidyl groups.

5. A curable composition according to claim 1, further comprising an acid.

6. A curable composition according to claim 5, wherein the acid comprises a superacid.

7. A curable composition according to claim 1, wherein the curable composition comprises a B-stage curable composition.

8. A method of curing a composition, the method comprising:

providing a curable composition comprising:

x equivalents of at least one 3-substituted benzoxazine, wherein x is a number greater than 0, wherein the at least one 3-substituted benzoxazine is selected from the group consisting of

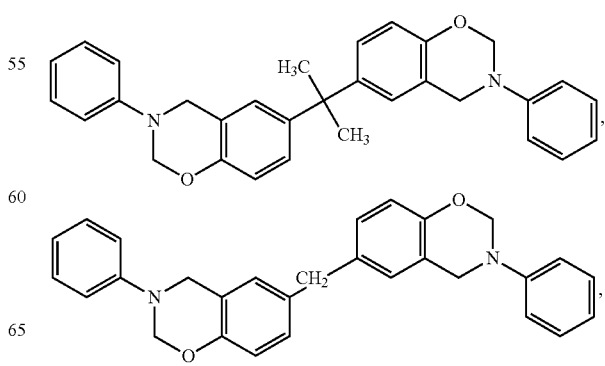

-continued

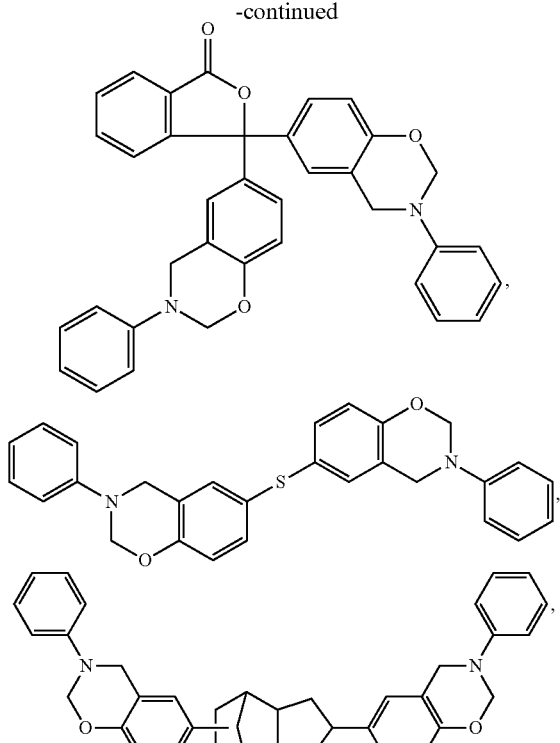

and combinations thereof;
at least one polyepoxide, wherein the at least one polyepoxide contains y equivalents of glycidyl groups, wherein y is a number greater than or equal to 0; and
z equivalents of at least one polythiol selected from the group consisting of

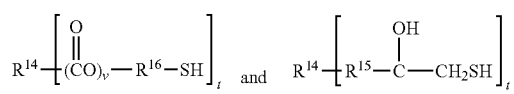

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, a hydroxyalkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
wherein z is a number greater than 0, and wherein z is in a range of from 0.1(x+y) to (x+y); and
curing the curable composition.

9. A method according to claim 8, wherein z is in a range of from 0.1(x+y) to 0.3(x+y).

10. A method according to claim 8, wherein y is in a range of from 0.1x to x.

11. A method according to claim 8, wherein the at least one polyepoxide comprises a polyepoxide having glycidyl groups.

12. A method according to claim 8, wherein the curable composition further comprises a superacid.

13. A tack-free reaction product of a curable composition, the curable composition comprising:
x equivalents of at least one 3-substituted benzoxazine, wherein x is a number greater than 0, wherein the at least one 3-substituted benzoxazine is selected from the group consisting of

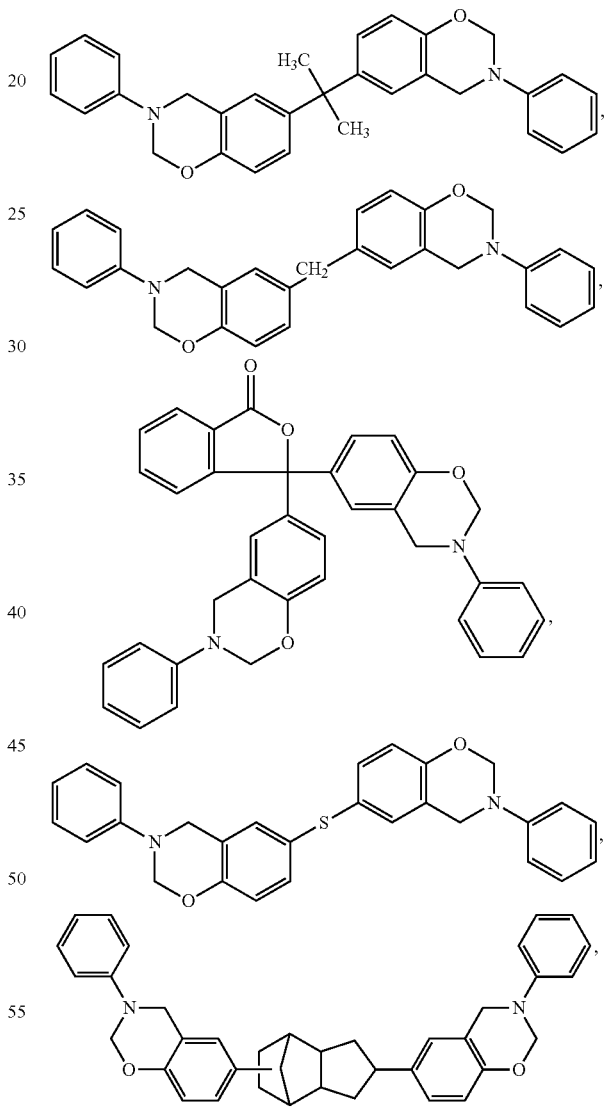

and combinations thereof;
at least one polyepoxide, wherein the at least one polyepoxide contains y equivalents of glycidyl groups, wherein y is a number greater than or equal to 0; and
z equivalents of at least one polythiol selected from the group consisting of

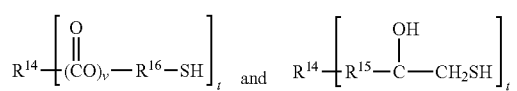

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, a hydroxyalkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
wherein z is a number greater than 0, and wherein z is in a range of from 0.1(x+y) to (x+y).

14. A tack-free reaction product according to claim 13, wherein z is in a range of from 0.1(x+y) to 0.3(x+y).

15. A tack-free reaction product according to claim 13, wherein y is in a range of from 0.1x to x.

16. A tack-free reaction product according to claim 13, wherein the at least one polyepoxide comprises a polyepoxide having glycidyl groups.

17. A tack-free reaction product according to claim 13, wherein the components further comprise an acid.

18. A tack-free reaction product according to claim 17, wherein the acid comprises a superacid.

19. An article comprising a curable composition disposed on a first releasable liner, wherein the curable composition comprises:

x equivalents of at least one 3-substituted benzoxazine, wherein x is a number greater than 0, wherein the at least one 3-substituted benzoxazine is selected from the group consisting of

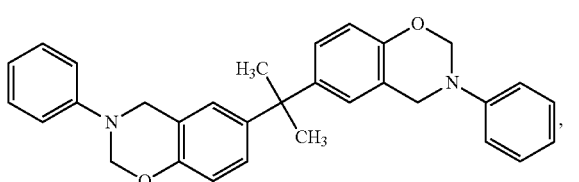

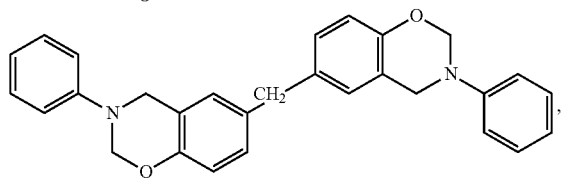

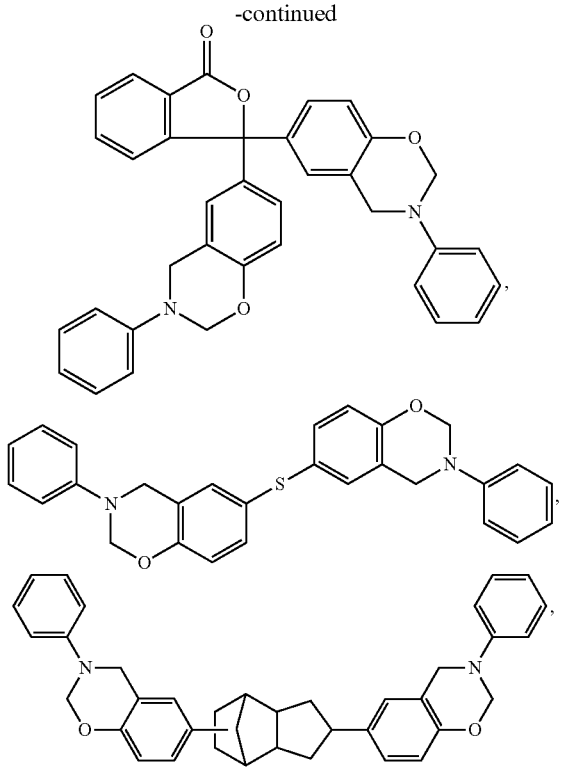

and combinations thereof;
at least one polyepoxide, wherein the at least one polyepoxide contains y equivalents of glycidyl groups, wherein y is a number greater than or equal to 0; and
z equivalents of at least one polythiol selected from the group consisting of

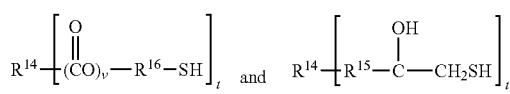

wherein
v is 0 or 1;
t is an integer in a range of from 1 to 6, inclusive;
$R^{14}$ is a t-valent hydrocarbyl radical having from 1 to 30 carbon atoms; and
$R^{15}$ is selected from the group consisting of an alkylene group having from 1 to 30 carbon atoms, a hydroxyalkylene group having from 1 to 30 carbon atoms, an oxyalkylene group having from 1 to 30 carbon atoms, a polyoxyalkylene group having from 4 to 100 carbon atoms, and combinations thereof;
$R^{16}$ is selected from the group consisting of an alkylene group having from 1 to 30 carbon atoms, an alkyleneoxyalkylene group having from 1 to 30 carbon atoms, an alkylenepolyoxyalkylene group having from 4 to 100 carbon atoms, and combinations thereof; and
wherein z is a number greater than 0, and wherein z is in a range of from 0.1(x+y) to (x+y).

20. The article of claim 19, wherein the curable composition is sandwiched between the first releasable liner and a second releasable liner.

* * * * *